US012438928B2

(12) United States Patent
Laister et al.

(10) Patent No.: US 12,438,928 B2
(45) Date of Patent: Oct. 7, 2025

(54) SHARED MEDIA

(71) Applicant: QUALCOMM Incorporated, San Diego, CA (US)

(72) Inventors: Andrew John Laister, Cambridge (GB); John Turner, Ely (GB); Miran Chun, San Diego, CA (US); Xiaoxin Zhang, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/511,412

(22) Filed: Nov. 16, 2023

(65) Prior Publication Data

US 2024/0179192 A1 May 30, 2024

Related U.S. Application Data

(60) Provisional application No. 63/385,174, filed on Nov. 28, 2022.

(51) Int. Cl.
*H04L 65/1069* (2022.01)
*H04L 65/402* (2022.01)
*H04W 8/00* (2009.01)

(52) U.S. Cl.
CPC ........ *H04L 65/1069* (2013.01); *H04L 65/402* (2022.05); *H04W 8/005* (2013.01)

(58) Field of Classification Search
CPC ... H04L 65/1069; H04L 65/402; H04W 8/005
USPC ...................................................... 709/227
See application file for complete search history.

(56) References Cited

U.S. PATENT DOCUMENTS

| 10,117,206 | B2 | 10/2018 | Zhu | |
| 10,389,782 | B2* | 8/2019 | Alsina | H04L 65/60 |
| 2008/0162668 | A1 | 7/2008 | Miller | |
| 2013/0324036 | A1* | 12/2013 | Hillan | H04W 8/005 |
| | | | | 455/41.1 |
| 2015/0099469 | A1 | 4/2015 | Goldstein | |
| 2016/0164933 | A1 | 6/2016 | Kafle et al. | |
| 2016/0198327 | A1* | 7/2016 | Park | H04W 8/005 |
| | | | | 370/330 |

(Continued)

OTHER PUBLICATIONS

International Search Report and Written Opinion—PCT/US2023/080213—ISA/EPO—Mar. 18, 2024.

*Primary Examiner* — Glenford J Madamba
(74) *Attorney, Agent, or Firm* — QUALCOMM Incorporated; Espartaco Diaz Hidalgo

(57) ABSTRACT

A first device includes one or more processors configured to determine, based on one or more wireless signals, a candidate device list identifying one or more devices that are within a communication range of one or more sensing devices. The one or more processors are further configured to, based on a determination to initiate a shared media session with a second device of the candidate device list, receive a media stream including particular media content from a remote media service while the particular media content is being sent from the remote media service to the second device. The one or more processors are further configured to, based on the determination to initiate the shared media session, cause the particular media content to be output, based on synchronization information, contemporaneous with output of the particular media content at the second device.

30 Claims, 16 Drawing Sheets

(56) References Cited

U.S. PATENT DOCUMENTS

2020/0382569 A1\* 12/2020 Fornshell .............. H04L 7/0091
2022/0295436 A1\* 9/2022 Alsina ................ H04N 21/4825

\* cited by examiner

SHARED MEDIA

I. CROSS-REFERENCE TO RELATED APPLICATIONS

The present application claims priority from the commonly owned U.S. Provisional Patent Application No. 63/385,174, filed Nov. 28, 2022, entitled "SHARED MEDIA," the content of which is incorporated herein by reference in its entirety.

II. Field

The present disclosure is generally related to sharing of media content.

III. Description of Related Art

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. The increasing availability of such portable computing devices has been accompanied by increasing availability of accessory devices for the portable computing devices. For example, many wearable devices are available that wirelessly interface with a portable computing device to improve the user experience of an application executed onboard the personal computing device. Due to size and weight constraints associated with such wearable devices, batteries onboard these devices tend to be rather small and limited, resulting in limitations on the functionality of such devices.

IV. SUMMARY

In a particular implementation, a first device includes one or more processors configured to determine, based on one or more wireless signals, a candidate device list identifying one or more devices that are within a communication range of one or more sensing devices. The one or more processors are further configured to, based on a determination to initiate a shared media session with a second device of the candidate device list, receive a media stream including particular media content from a remote media service while the particular media content is being sent from the remote media service to the second device. The one or more processors are further configured to, based on the determination to initiate the shared media session, cause the particular media content to be output, based on synchronization information, contemporaneous with output of the particular media content at the second device.

In a particular implementation, a method includes determining, by one or more processors of a first device and based on one or more wireless signals, a candidate device list identifying one or more devices that are within a communication range of one or more sensing devices. The method also includes, based on a determination to initiate a shared media session with a second device of the candidate device list, receiving, by the one or more processors, a media stream including particular media content from a remote media service while the particular media content is being sent from the remote media service to the second device. The method further includes, based on the determination to initiate the shared media session, causing the particular media content to be output, based on synchronization information, contemporaneous with output of the particular media content at the second device.

In a particular implementation, a non-transitory computer-readable medium stores instructions that, when executed by one or more processors of a first device, cause the one or more processors to determine, based on one or more wireless signals, a candidate device list identifying one or more devices that are within a communication range of one or more sensing devices. The instructions are further executable by the one or more processors to, based on a determination to initiate a shared media session with a second device of the candidate device list, receive a media stream including particular media content from a remote media service while the particular media content is being sent from the remote media service to the second device. The instructions are further executable by the one or more processors to, based on the determination to initiate the shared media session, cause the particular media content to be output, based on synchronization information, contemporaneous with output of the particular media content at the second device.

In a particular implementation, an apparatus includes means for determining, based on one or more wireless signals, a candidate device list identifying one or more devices that are within a communication range of one or more sensing devices. The apparatus also includes means for receiving, based on a determination to initiate a shared media session between a first device and a second device of the candidate device list, a media stream including particular media content from a remote media service while the particular media content is being sent from the remote media service to the second device. The apparatus further includes means for causing the particular media content to be output, based on synchronization information, contemporaneous with output of the particular media content at the second device.

In a particular implementation, a first device includes one or more processors configured to, during a first time period after initiation of a shared media session, set first discovery parameters for discovery of candidate devices for media sharing. The one or more processors are further configured to, during a second time period after termination of the shared media session, set second discovery parameters for discovery of candidate devices for media sharing. The second discovery parameters specify a faster discovery rate than the first discovery parameters.

In a particular implementation, a method includes, during a first time period after initiation of a shared media session, setting, by one or more processors, first discovery parameters for discovery of candidate devices for media sharing. The method also includes, during a second time period after termination of the shared media session, setting, by the one or more processors, second discovery parameters for discovery of candidate devices for media sharing. The second discovery parameters specify a faster discovery rate than the first discovery parameters.

In a particular implementation, a non-transitory computer-readable medium stores instructions that, when executed by one or more processors, cause the one or more processors to during a first time period after initiation of a shared media session, set first discovery parameters for discovery of candidate devices for media sharing. The instructions are further executable by the one or more processors to, during a second time period after termination of the shared media session, set second discovery parameters for discovery of candidate devices for media sharing. The second discovery parameters specify a faster discovery rate than the first discovery parameters.

In a particular implementation, an apparatus includes means for, during a first time period after initiation of a shared media session, setting first discovery parameters for discovery of candidate devices for media sharing. The apparatus also includes means for, during a second time period after termination of the shared media session, setting second discovery parameters for discovery of candidate devices for media sharing. The second discovery parameters specify a faster discovery rate than the first discovery parameters.

In a particular implementation, a device includes one or more processors configured to obtain a candidate device list associated with a first device. The candidate device list identifies one or more devices that are within a communication range of a sensing device associated with the first device. The one or more processors are further configured to, based on permissions data associated with the first device, send a sharing invitation to a second device of the candidate device list, and based on a response to the sharing invitation, send a first media stream including particular media content to the first device. The one or more processors are further configured to, while sending the first media stream to the first device, send a second media stream including the particular media content to the second device for output at the second device contemporaneous with output of the particular media content at the first device.

In a particular implementation, a method includes obtaining a candidate device list associated with a first device. The candidate device list identifies one or more devices that are within a communication range of a sensing device associated with the first device. The method also includes, based on permissions data associated with the first device, sending a sharing invitation to a second device of the candidate device list, and based on a response to the sharing invitation, sending a first media stream including particular media content to the first device. The method further includes, while sending the first media stream to the first device, sending a second media stream including the particular media content to the second device for output at the second device contemporaneous with output of the particular media content at the first device.

In a particular implementation, a non-transitory computer-readable medium stores instructions that, when executed by one or more processors, cause the one or more processors to obtain a candidate device list associated with a first device. The candidate device list identifies one or more devices that are within a communication range of a sensing device associated with the first device. The instructions are further executable by the one or more processors to, based on permissions data associated with the first device, send a sharing invitation to a second device of the candidate device list, and based on a response to the sharing invitation, send a first media stream including particular media content to the first device. The instructions are further executable by the one or more processors to, while sending the first media stream to the first device, send a second media stream including the particular media content to the second device for output at the second device contemporaneous with output of the particular media content at the first device.

In a particular implementation, an apparatus includes means for obtaining a candidate device list associated with a first device. The candidate device list identifies one or more devices that are within a communication range of a sensing device associated with the first device. The apparatus also includes means for sending a sharing invitation to a second device of the candidate device list based on permissions data associated with the first device and means for sending a first media stream including particular media content to the first device based on a response to the sharing invitation. The apparatus further includes means for sending, while sending the first media stream to the first device, a second media stream including the particular media content to the second device for output at the second device contemporaneous with output of the particular media content at the first device.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
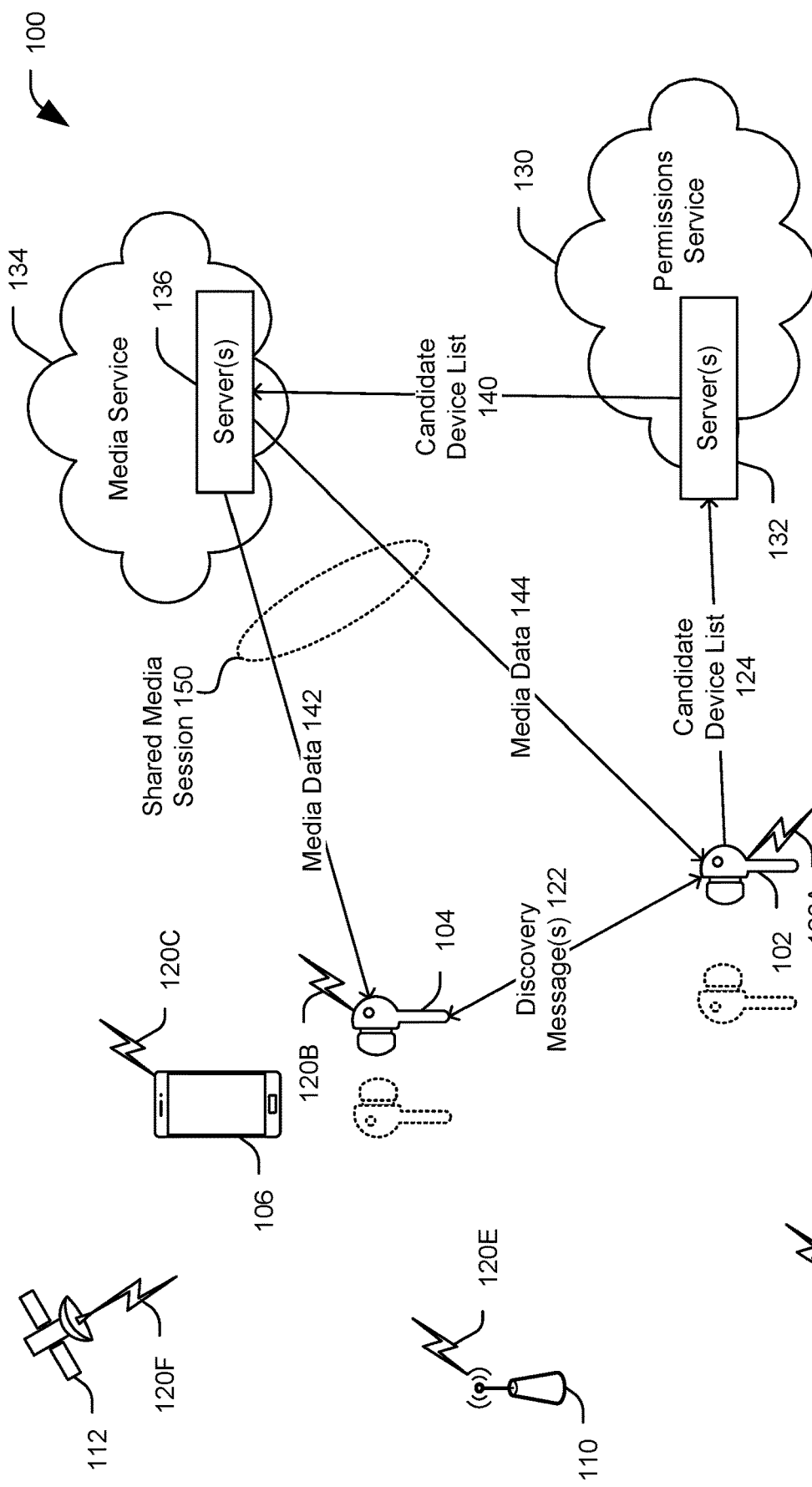
FIG. 1 is a diagram of a particular illustrative aspect of a system operable to establish a shared media session between two or more devices, in accordance with some examples of the present disclosure.

As use of portable computing device and wearable devices for consumption of media has become more common, consumption of media has become a more isolated and individual experience. For example, when a user is streaming media via a smart phone to wireless earbuds or headphones, only the user is able to enjoy the media content. There are many situations where the user experience could be improved by enabling the user to easily share the media content with another user; however, it can be difficult to set up media sharing between such portable devices. In general, such shared media sessions must be set up locally, such as by physically exchanging one earbud of a pair with another user. Obviously, this solution has many problems, such as the potential to lose the exchanged earbud. Further, in this solution, each user is able to consume only one channel of the media (e.g., a right channel or a left channel of stereo content), which does not provide either user with a complete experience of the media. Additionally, only two users can share media using this solution since earbuds come in pairs.

Systems and methods of establishing a shared media session are disclosed. While the disclosed systems and methods are suitable for use with any appropriately configured device, the disclosed systems and methods are particularly beneficial when used with wearable devices or similar devices that have limited user interfaces and/or limited onboard power.

In particular implementations, a first device is configured to initiate, control, or perform operations to establish a shared media session with a second device. In some examples, the first device includes or corresponds to an earbud or a pair of earbuds associated with a first user, and the second device includes or corresponds to an earbud or a pair of earbuds associated with a second user. In other examples, the first and second devices are headphones, headset devices that include displays (e.g., extended reality headset or augmented reality glasses), vehicles, portable speaker and voice assistant devices, other wearable devices, or any combination thereof. Additionally, the first and second devices need not be of the same type. For example, the first device can include a pair of earbuds, and the second device can include headphones or a vehicle.

The shared media session between the first and second devices is arranged such that each of the devices receives media content via a media stream from a media service associated with the devices. For example, a media service such as Netflix or Spotify can send a first media stream to the first device and a second media stream to the second device, where the first and second media streams include the same media content item(s) (e.g., the same song(s), the same movie(s), etc.). In this example, synchronization information (e.g., such as timing signals, time-to-play timestamps, etc.) is also provided to or exchanged between the devices to enable contemporaneous output of the media content at the devices. Thus, each device receives an independent media stream, but the media streams are locally synchronized for playout at the devices. One benefit of this arrangement is that local set up of the shared media session is simplified, and the user experience is improved. For example, users associated with the devices are able to enjoy the full media content (e.g., both stereo channels), rather than only a portion of the media content. A further benefit is that, because the devices independently receive the media content from the media service for synchronized playout, any number of such devices can be joined to the shared media session.

The disclosed systems and methods also provide a simplified mechanism to establish the shared media session from the media service. For example, the devices can use wireless signals to perform discovery processes in the background to identify nearby devices that are candidates for media sharing. Since battery power available onboard the devices can be limited, in some circumstances, the devices can offload some or all of the discovery processes to proxy devices, such as wireless access points or portable communication devices. One benefit of offloading discovery processes to proxy devices is that battery power and computing resources onboard the devices are conserved.

Figure 5:
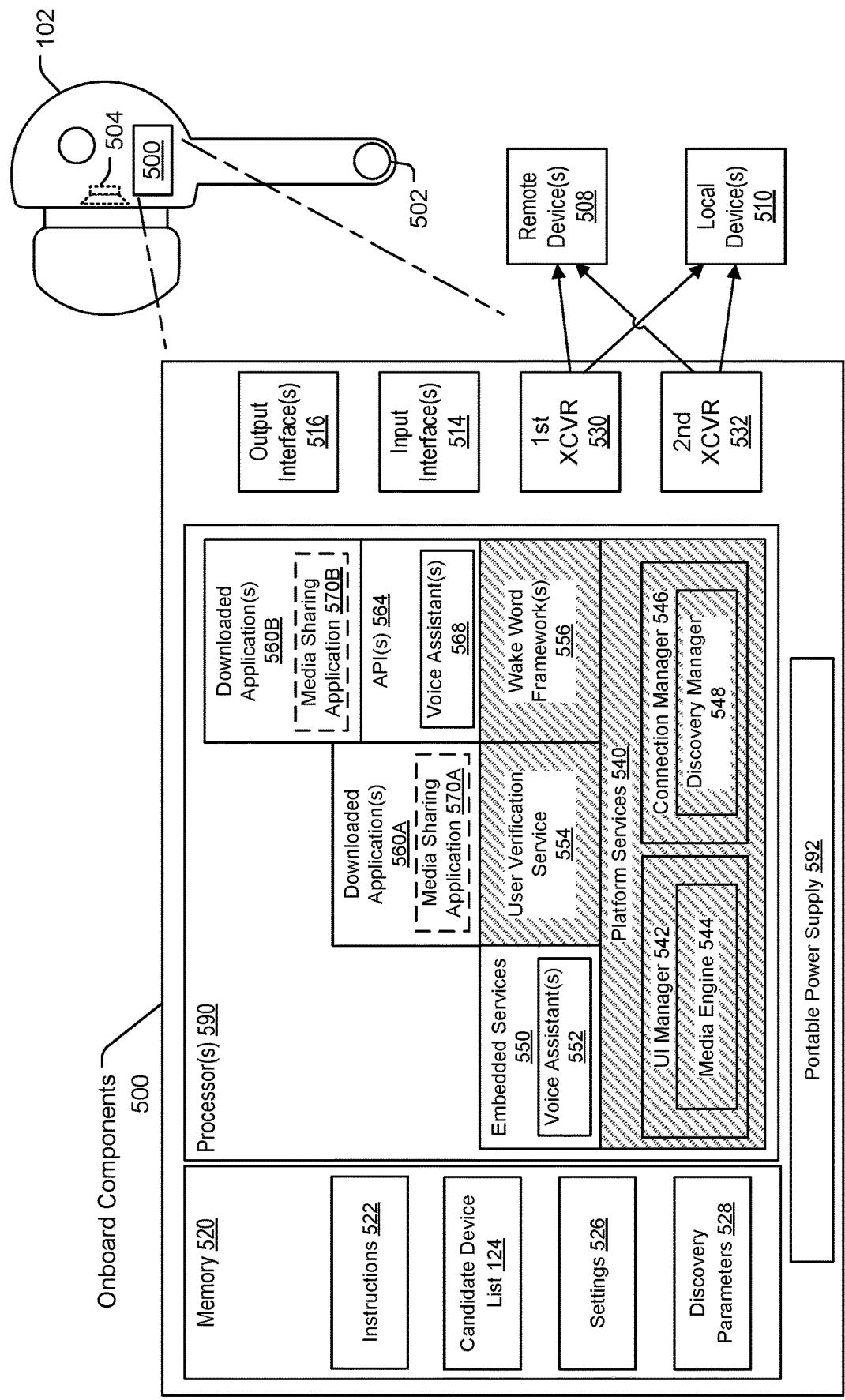
FIG. 5 is a block diagram of an illustrative aspect of a device operable to establish a shared media session with one or more other devices, in accordance with some examples of the present disclosure.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 5 depicts a first device 102 that includes one or more processors ("processor(s)" 590 of FIG. 5), which indicates that in some implementations the first device 102 includes a single processor 590 and in other implementations the first device 102 includes multiple processors 590. For ease of reference herein, such features are generally introduced as "one or more" features and are subsequently referred to in the singular or optional plural (generally indicated by "(s)") unless aspects related to multiple of the features are being described.

In some drawings, multiple instances of a particular type of feature are used. Although these features are physically and/or logically distinct, the same reference number is used for each, and the different instances are distinguished by addition of a letter to the reference number. When the features as a group or a type are referred to herein, e.g., when no particular one of the features is being referenced, the reference number is used without a distinguishing letter. However, when one particular feature of multiple features of the same type is referred to herein, the reference number is used with the distinguishing letter. For example, referring to FIG. 1, multiple wireless signals are illustrated and associated with reference numbers 120A-120F. When referring to a particular one of these wireless signals, such as a wireless signal 120A, the distinguishing letter "A" is used. However, when referring to any arbitrary one of these wireless signals or to these wireless signals as a group, the reference number 120 is used without a distinguishing letter.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

FIG. 1 is a diagram illustrating a particular implementation of a system 100 operable to establish a shared media session between two or more devices in accordance with some examples of the present disclosure. The system 100 includes a first device 102 and a second device 104. In the example illustrated in FIG. 1, the first device 102 and the second device 104 are earbuds. Each earbud may be associated with a particular user. For example, the first earbud (e.g., the first device 102) may be associated with a first user, and the second earbud (e.g., the second device 104) may be associated with a second user. Although the following description generally only refers to two devices 102, 104, as shown in FIG. 1, each of the devices 102, 104 may correspond to or be part of a pair. To illustrate, the first device 102 is illustrated as a single earbud; however, optionally, the first device 102 may include or be part of a paired set of earbuds. Likewise, the second device 104 is illustrated as a single earbud; however, optionally, the second device 104 may include or be part of a paired set of earbuds.

In a particular aspect, a shared media session 150 may be established between the first device 102 and the second device 104 based on proximity of the devices 102, 104 to one another and permissions associated with the devices 102, 104. In some implementations, the shared media session 150 maybe established based on determination that the second device 104 is within a communication range of one or more sensing devices. In such implementations, the sensing device(s) may be integrated within the first device 102 or maybe separate from the first device 102. For example, the sensing device(s) may be integrated within a wireless access point 110 configured to support a wireless local area network (WLAN), such as a WiFi network. In another example, the sensing device(s) may be integrated within a portable communication device 106, such as a smart phone. To illustrate, the portable communication device 106 may be configured to support a WLAN or a personal area network (PAN), such as one or more Bluetooth communication links.

In some implementations, proximity of the devices 102, 104 to the sensing device(s) may be determined based on ability of the sensing device(s) to communicate with the devices 102, 104. For example, when a sensing device is integrated within the wireless access point 110 and the first device 102 is within a coverage area of the WLAN associated with the wireless access point 110, the first device 102 and the wireless access point 110 may exchange discovery messages (e.g., via wireless signals 120A transmitted by the first device 102, wireless signals 120E transmitted by the wireless access point 110, or both), enabling the sensing device to determine an approximate location of the first device 102. In this example, the determined location of the first device 102 may be relatively coarse, such as merely that the first device 102 is within the coverage area of the WLAN.

Optionally, in some implementations, more refined location information can be determined. For example, the sensing device may be configured to determine an approximate distance to the first device 102 based on a received signal strength of one or more wireless signals 120A transmitted by the first device 102. Additionally, or alternatively, the wireless access point 110 may include multiple antennas enabling the sensing device to determine a direction (e.g., an angle relative to a reference angle) of the first device 102 using beamforming techniques, enabling the sensing device to use multilateration techniques to determine location coordinates of the first device 102, or both. Further, in some implementations, the wireless access point 110 is one of several wireless access points in a coverage area of the WLAN (e.g., part of a mesh network), and one or more additional wireless access points may determine location information associated with the first device 102 and exchange the location information with the wireless access point 110 to determine a more accurate and/or more precise location of the first device 102.

Similarly, when the second device 104 is within a coverage area of the WLAN associated with the wireless access point 110, the second device 104 and the wireless access point 110 may exchange discovery messages (e.g., via wireless signals 120B transmitted by the second device 104, the wireless signals 120E transmitted by the wireless access point 110, or both) enabling the sensing device(s) to determine an approximate location of the second device 104. Based on the approximate locations of the first device 102 and the second device 104, the sensing device(s) may determine that the second device 104 is a candidate for establishing the shared media session 150 with the first device 102. Alternatively, the sensing device(s) may provide information identifying nearby devices to the first device 102, the second device 104, or both, and one or more of the devices 102, 104 may identify candidates for establishing the shared media session 150.

In some implementations, the sensing device can use phase-based ranging (based on the wireless signals 120) to estimate the location of the first device 102, the second device 104, or both. One example of a phase-based ranging technique is high-accuracy distance measurement (HADM) based on Bluetooth Low-Energy (BLE) transmissions. Additionally, or alternatively, the sensing device can use signal strength-based techniques to estimate the location of the first device 102, the second device 104, or both. To illustrate, the wireless signals 120B transmitted by the second device 104 can include a transmission power indicator, and the sensing device can compare the transmission power indicator to a signal strength of the wireless signal 120B as received at the sensing device to estimate the distance between the second device 104 and the sensing device. When a single sensing device is used, an appropriate range to the second device 104 can be determined. When three or more sensing devices are used, techniques such as multilateration based on the received signal strength or received signal strength fingerprinting can be used to estimate the coordinate location of (or distance and direction to) the second device 104.

When the sensing device(s) are integrated within the portable communication device 106, the portable communication device 106 may perform the operations described above with reference to the wireless access point 110. In some implementations, sensing devices within the wireless access point 110, sensing devices within the portable communication device 106, one or more other sensing devices distinct from the devices 102, 104, or any combination thereof, may cooperate to identify a set of nearby devices.

In some implementations, a sensing device is integrated within the first device 102, the second device 104, or both and configured to identify nearby devices. For example, the first device 102 and second device 104 may exchange discovery messages 122 (e.g., via the wireless signals 120A transmitted by the first device 102, the wireless signals 120B transmitted by the second device 104, or both). For example, the first device 102 may determine that the second device 104 is within communication range of the sensing device of the first device 102 based on the first device 102 receiving one or more of the discovery messages 122 from the second device 104.

In some implementations, the sensing device(s) determine locations of the first device 102, the second device 104, or both, based on wireless signals 120 from one or more other devices. For example, a sensing device associated with the first device 102 may be configured to receive wireless signals 120D from one or more wireless wide area networks 108 (WWANs), such as one or more base stations of a voice and data network operating according to one or more third generation (3G) mobile telecommunication standards, according to one or more fourth generation (2G) mobile telecommunication standards, according to one or more fifth generation (5G) mobile telecommunication standards, according to one or more sixth generation (6G) mobile telecommunication standards, or according to one or more other mobile telecommunications standards. In such implementations, a sensing device onboard the first device 102 may estimate the location of the first device 102 based on the wireless signals 120D, such as using a multilateration techniques based on signals from multiple base stations or using location probability estimates based on coverage area(s) associated with one or more base stations.

In another example, a sensing device associated with the first device 102 may be configured to receive wireless signals 120F from one or more satellites 112 (e.g., satellites associated with a positioning service, such as the Global Positioning Satellite (GPS) system or the Global Navigation Satellite System). When the wireless signals 120D, 120E, 120F, or a combination thereof, are used to estimate the location of one or more of the devices 102, 104, the location may be estimated as a set of coordinates (e.g., a coordinate location). In such examples, the coordinate locations of one or more of the devices 102, 104 may be exchanged (e.g., via the discovery messages(s) 122) with one another, or may be transmitted to another device (e.g., the wireless access point 110, the portable communication device 106, or servers 132, 136 of a remote service) to estimate a distance between the devices 102, 104.

In a particular implementation, when the first device 102 is in an operating mode that enables establishment of the shared media session 150, the first device 102 determines a candidate device list 124. The candidate device list 124 identifies one or more devices (such as the second device 104) that are within a communication range of the sensing device(s). In implementations in which the sensing device(s) are integrated within the first device 102, the candidate device list 124 identifies one or more devices that are within a communication range of the first device 102. In some implementations, the sensing device(s) are not integrated within the first device 102, in which case the sensing device(s) identify nearby devices and send a list of the nearby devices to the first device 102. In such implementations, the list of nearby devices may include or correspond to the candidate device list 124. For example, the candidate device list 124 may include a subset of the list of nearby devices.

In some implementations, the system 100 includes more than one sensing device. To illustrate, the first device 102 may include two or more transceivers, and each of the transceivers may include, correspond to, or be included within, a sensing device. For example, the first device 102 may include a first transceiver configured to communicate using a first communication protocol (such as Bluetooth) and may also include a second transceiver configured to communicate using a second communications protocol (such as Wi-Fi). In this example, the first transceiver may be configured to determine a first set of candidate devices that are within a communication range associated with the first communication protocol, and the second transceiver may be configured to determine a second set of candidate devices that are within a communication range associated with the second communication protocol. In this example, the candidate device list 124 may identify the first set of candidate devices and the second set of candidate devices.

In a particular implementation, a sensing device is configured to determine whether a particular device is within communication range based on a distance metric. In such implementations, the distance metric may indicate an estimated distance between the particular device and the one or more sensing devices. In such implementations, the sensing device may determine an estimated distance between the sensing device and the second device 104 based on the positions (e.g., coordinate locations) of each device.

In some implementations, which sensing device(s) are used to determine the candidate device list 124 depends on a context in which the first device 102 is operating. For example, when the first device 102 is located within a communication range of the WLAN of the wireless access point 110, the first device 102 may offload identification of nearby devices to the wireless access point 110 in order to conserve power onboard the first device 102. As another example, when the first device 102 is participating in a shared media session (e.g., the shared media session 150), the first device 102 may adjust discovery parameters associated with generation of the candidate device list 124 to reduce power consumption onboard the first device 102.

In the example illustrated in FIG. 1, the candidate device list 124 is sent to one or more servers 132 of a permissions service 130. The permissions service 130 is configured to determine whether any device identified on the candidate device list 124 is identified on a permissions list associated with a remote media service 134. The permissions list indicates which devices and/or users the first device 102 is permitted to establish shared media sessions with. In a particular implementation, the permissions service 130 is configured to send a candidate device list 140 to the media service 134 based on the permissions list. For example, each candidate device of the candidate device list 124 that is on the permissions list at the permissions service 130 may be listed in the candidate device list 140 sent to the media service 134. To illustrate, after exchange of the discovery message(s) 122 the first device 102 may add the second device 104 to its candidate device list 124 and send the candidate device list 124 to the permissions service 130. In this example, the permissions service 130 determines whether the second device 104 is identified on the permissions list. Based on a determination that the second device 104 is identified on the permissions list, the permissions service 130 sends the candidate device this 140 identifying the second device 104 to the media service 134.

The media service 134 is configured to provide media content such as extended reality content, video content, game content, audio content, or a combination thereof, from one or more servers 136 of the media service 134 to the first device 102, the second device 104, or both. For example, in some implementations, the servers 136 are configured to send data packets including media data to an internet protocol (IP) address (or another communication address) associated with the first device 102, to an IP address associated with the second device 104, or both. In other implementations, the servers 136 are configured to send the media data to a gateway device associated with at least one of the devices 102, 104. For example, the wireless access point 110 or the portable communication device 106 may act as a gateway device for one or both of the devices 102, 104.

In a particular implementation, the media service 134 is configured to determine whether any device identified on the candidate device list 140 is associated with an account at the media service 134. For example, when the second device 104 is identified on the candidate device list 140, the servers 136 may compare an identifier of the second device 104 to identifiers of devices associated with user accounts at the media service 134. In this example, when the identifier associated with the second device 104 is associated with a user identifier of a user account, the media service 134 determines that the second device 104 is approved to participate in a shared media session (e.g., the shared media session 150).

Optionally, in some implementations, based on a determination that the second device 104 is approved to participate in the shared media session 150, the media service 134 sends a prompt to the first device 102 to determine whether a user of the first device 102 would like to initiate media sharing. In such implementations, the media service 134 updates media sharing permissions based on a response to the prompt. For example, in response to the prompt, a user of the first device 102 may indicate that media sharing is always to be initiated with the second device 104 when the first device 102 and the second device 104 are at a particular location, are within range of one another, or when other conditions are met. In this example, the media sharing permissions are updated to indicate that, in the future, sharing should be initiated without sending a prompt to the first device 102 if specified conditions are satisfied. As another example, in response to the prompt, the user of the first device 102 may indicate that media sharing should never be initiated with the second device 104 or should not be initiated with the second device 104 when particular conditions are met. In this example, the media sharing permissions are updated to indicate that, in the future, sharing should not be initiated or prompted if specified conditions are satisfied. In other examples, in response to the prompt, the user of the first device 102 may indicate that media sharing should or should not be initiated with the second device 104 in this particular instance. In these examples, the media sharing permissions are updated to indicate that sharing may be initiated or may not be initiated in this instance.

Based on a determination that the second device 104 is approved for media sharing (and optionally that sharing conditions are satisfied), the media service 134 sends a sharing invitation to the second device 104. In some implementations, the sharing invitation includes a resource address (such as a universal resource locator (URL)) associated with the shared media session 150. Additionally, or alternatively, the sharing invitation may identify specific media content to be shared during the shared media session 150, a time period for the shared media session 150, other limitations or configuration information associated with the shared media session 150, or a combination thereof.

In a particular implementation, the media service 134 is configured to initiate the shared media session 150 based on a response to the sharing invitation sent to the second device 104. For example, initiating the shared media session 150 may include sending a first media stream including media data 144 to the first device 102 and sending a second media stream including media data 142 to the second device 104. In this example, the media data 142 and the media data 144 include the same media content. Additionally, the media data 142 and media data 144 may be configured for contemporaneous output at the first device 102 and the second device 104. For example, the media data 142 and the media data 144 may include or be associated with synchronization information, such as timestamps associated with play out of particular portions of the media content. Optionally, the media service 134 may transmit separate synchronization information, such as a clock signal or other timing information, to regulate a rate of playout of the media content at the first device 102 and the second device 104.

The first device 102 is configured to receive the media data 144 via the first media stream from the media service 134, and the second device 104 is configured to receive the media data 142 via the second media stream from the media service 134. The first device 102 and the second device 104 are configured to output media content of the media data 142, 144 contemporaneously based on synchronization information. In some implementations, the synchronization information is provided by the media service 134 in the shared media session 150. In other implementations the first device 102 and the second device 104 exchange the synchronization information directly with one another or indirectly with one another via one or more proxy devices, such as the wireless access point 110. In still other implementations, the synchronization information is received by the first device 102 and the second device 104 from a synchronization signal generator of another device, such as via the wireless signals 120E of the wireless access point 110, via the wireless signals 120F (e.g., satellite-based timing signals) of the satellite(s) 112, via the wireless signals 120D of the WWAN, or via the wireless signals 120C of the portable communication device 106.

In some implementations, the first device 102 transmits, or receives, discovery messages 122 at different rates depending on whether the first device 102 is in a shared media session 150. For example, during a first time period after the shared media session 150 is initiated, the first device 102 may set first discovery parameters for discovery of candidate devices for adding to the shared media session 150. In this example, during a second time period after termination of the shared media session 150, the first device 102 sets second discovery parameters for discovery of candidate devices for establishing a shared media session. In this example, the second discovery parameters may specify a faster discovery rate (e.g., a shorter interval between discovery periods) than the first discovery parameters. In some implementations, the first discovery parameters specify that no discovery is to be performed during the shared media session 150. In other implementations, the first discovery parameters specify a first time interval between iterations of discovery operations, and the second discovery parameters specify a second time interval between iterations of the discovery operations. In this example, the first time interval may be longer than the second time interval. For example, the first time interval may be at least 10 times longer than the second time interval, at least 100 times longer than the second time interval, or even at least 1000 times longer than the second time interval. One technical advantage of using a longer time interval between discovery operations when a shared media session 150 is ongoing, is reduction of power consumption onboard the first device 102, the second device 104, or both.

The first device 102 is configured to perform discovery operations based on a current set of discovery parameters. The current set of discovery parameters may be updated occasionally or periodically based on, for example, a power level of a battery of the first device 102, user configuration or other settings associated with the first device 102, movement of the first device 102 relative to the sensing device or relative to another device or location, movement of the second device 104 relative to the first device 102 or relative to another device or location, or any combination thereof.

In a particular implementation, results of the discovery processes may be used to terminate the shared media session 150. For example, during the shared media session 150, the first device 102 may perform one or more discovery processes based on current discovery parameters to update the candidate device list 124. In this example, if the second device 104 has moved outside a communication range or beyond a distance associated with the candidate device list 124, the first device 102 may update the candidate device list 124 to omit the second device 104. In this example the candidate device list 124 may be transmitted via the permissions service 130 to the media service 134, and the media service 134 may determine that the second device 104 is no longer approved for media sharing based on the updated candidate device list 124. In this example, the media service 134 terminates the shared media session 150 between the first device 102 and the second device 104 based on omission of the second device 104 from the candidate device this 124 of the first device 102.

In some implementations, the first device 102 may also be configured to add devices to the candidate device list 124 during the shared media session 150. For example, during the shared media session 150 with the second device 104, the first device 102 may perform one or more discovery processes, based on current discovery parameters, and determine that another device (e.g., a third device) is within communication range of the sensing device. In this example, the first device 102 may add the third device to the candidate device list 124 and send the updated candidate device list 124 (via the permissions service 130) to the media service 134. If other sharing criteria are satisfied by the third device, the media service 134 may send a sharing invitation to the third device to invite the third device to join the shared media session 150.

In some implementations, after the candidate device list 124 is transmitted to the permissions service 130, the first device 102 is configured to update the candidate device list 124 periodically or occasionally. In some such implementations, the first device 102 is configured to update the candidate device list 124 based on one or more wireless signals 120 received during a discovery process and to compare the updated version of the candidate device list 124 to a prior version of the candidate device list 124. In some such examples, the first device 102 is configured to initiate a determination of whether to add a device to the shared media session 150 or to terminate a device from the media session 150 based on differences between the versions of the candidate device list 124. In some such implementations, the first device 102 sends the differences between the versions of the candidate device list 124 to the permissions service 130 rather than sending the entire updated candidate device list 124. One technical advantage of sending the differences between the versions of the candidate device list 124 is that less data is required to send the differences than to send the entire update candidate device list 124; thus, communication resources (e.g., power and bandwidth) are used more efficiently.

Although FIG. 1 shows the permissions service 130 and the media service 134 as distinct entities, in some implementations, the permissions service 130 and the media service 134 are combined or integrated as a single service. Although FIG. 1 illustrates two devices (e.g., the first device 102 and the second device 104) participating in the shared media session 150, in other implementations, more than two devices may be proximate to one another and may participate in (or be invited to) the shared media session 150. For example, at a party at a particular home, any number of guests at the party may have personal devices, such as earbuds, headphones, etc., that can be joined to the shared media session 150.

In some implementations, the first device 102 is able to initiate a shared media session 150 independently of generation of the candidate device list 124, independently of the permissions service 130, independently of the sharing permissions or other previously specified sharing conditions at the media service 134, or a combination thereof. For example, independently of other factors, a user of the first device 102 can cause the first device 102 to send an instruction to the media service 134 to cause the media service 134 to send a sharing invitation to the second device 104.

As one example of operation of the system 100, the first device 102 is disposed at a particular location, such as a house, an office, or a shared public space. In this example, the first device 102 maybe receiving media content from the media service 134 via one or more wireless signals. At some point during operation of the first device 102, the first device 102 (or a sensing device associated with the first device 102) performs one or more discovery operations and discovers that the second device 104 is nearby. For example, the first device 102 may receive the discovery message(s) 122 from the second device 104 and determine that the second device 104 is nearby based on the discovery message(s) 122. As another example, the second device 104 may enter a coverage area of the WLAN supported by the wireless access point 110, and a sensing device of the wireless access point 110 may determine that the second device 104 is nearby and communicate this information to the first device 102. In response to determining that the second device 104 is nearby, the first device 102 adds the second device 104 to the candidate device list 124.

Continuing this example, the first device 102 periodically or occasionally sends the candidate device list 124 to the permissions service 130. The permissions service 130 compares the candidate device list 124 to permissions associated with the first device 102. For example, the permissions may be based on a contact list associated with the first device 102, may be associated with pre-configured settings associated with the first device 102, or a combination thereof. If the second device 104 is approved for sharing based on the permissions list at the permissions service 130, the permissions service 130 sends the candidate device list 140 identifying the second device 104 to the media service 134.

The media service 134 determines, based on an identifier of the second device 104, whether the second device 104 is associated with a user account at the media service 134. If the second device 104 is associated with a user account at the media service 134 and if other specified sharing conditions are satisfied, the media service 134 uses user account information associated with the second device 104 to transmit a sharing invitation to the second device 104.

The second device 104 may prompt a user of the second device 104 based on the sharing invitation. For example, the second device 104 may provide audio output indicating that the first device 102 has invited the second device 104 to join the shared media session 150. As another example, the second device 104 may include or be associated with a display screen (e.g., the second device 104 may be in wireless communication with the portable communication device 106, which includes a display screen), and the prompt may be displayed to the user via the display screen. Upon confirmation by the user to join the shared media session, the second device 104 may transmit a response to the sharing invitation to the media service 134.

Based on the response to the sharing invitation from the second device 104, the media service 134 updates permissions associated with media sharing of the second device 104 and initiates the shared media session 150. For example, the media service 134 transmits particular media content via the media data 144 to the first device 102 and transmits the particular media content via the media data 142 to the second device 104. Additionally in some implementations, the media service 134 may transmit synchronization information along with the media data 142, 144. In some implementations, the first device 102 and the second device 104 communicate synchronization information with one another. Additionally or alternatively, the first device 102 and the second device 104 receive synchronization information from a synchronization signal generator of another device. Using the media data 142 and the synchronization information, the second device 104 outputs the media content contemporaneously with the first device 102 outputting the same media content.

On technical benefit of the system 100 of FIG. 1 is that it enables two or more users to contemporaneously (e.g., simultaneously) consume particular media content via the shared media session 150. Another technical benefit of the system 100 of FIG. 1 is that the shared media session 150 can be established in an ad hoc manner based on availability or proximity of the devices 102, 104, rather than, for example, requiring user devices to be linked to one another or preconfigured. Another technical benefit of the system 100 of FIG. 1 is that resources (such as local battery power) can be conserved by setting discovery parameters based on context associated with one or more of the devices 102, 104. Another technical benefit of the system 100 of FIG. 1 is that resources (e.g., bandwidth, local battery power, etc.) can be conserved by sending differences between versions of the candidate device list 124 rather than sending the entire candidate device list 124.

Figure 2:
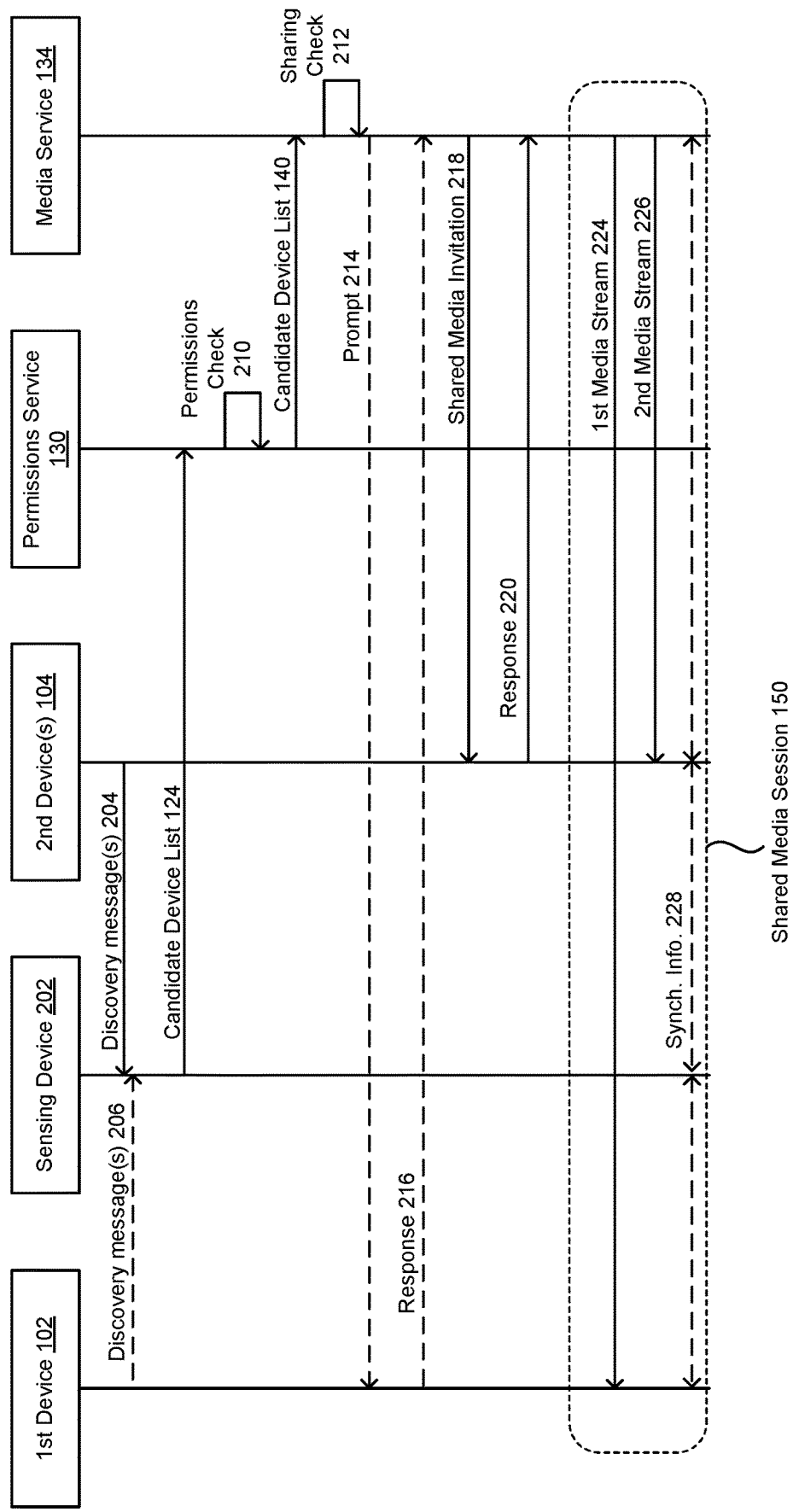
FIG. 2 is a diagram of an illustrative aspect of operations associated with establishing a shared media session between two or more devices, in accordance with some examples of the present disclosure.
Figure 3:
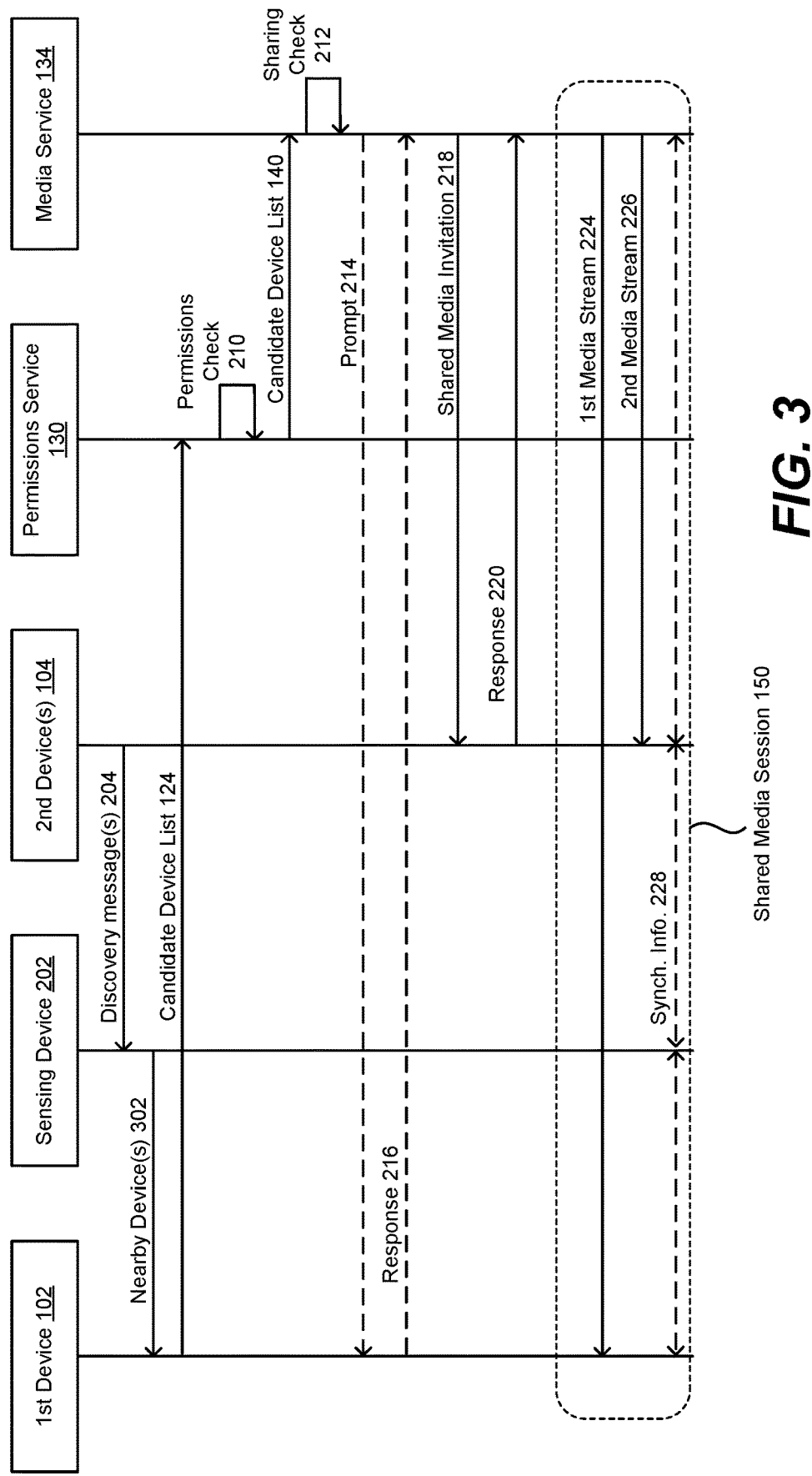
FIG. 3 is a diagram of an illustrative aspect of operations associated with establishing a shared media session between two or more devices, in accordance with some examples of the present disclosure.
Figure 4:
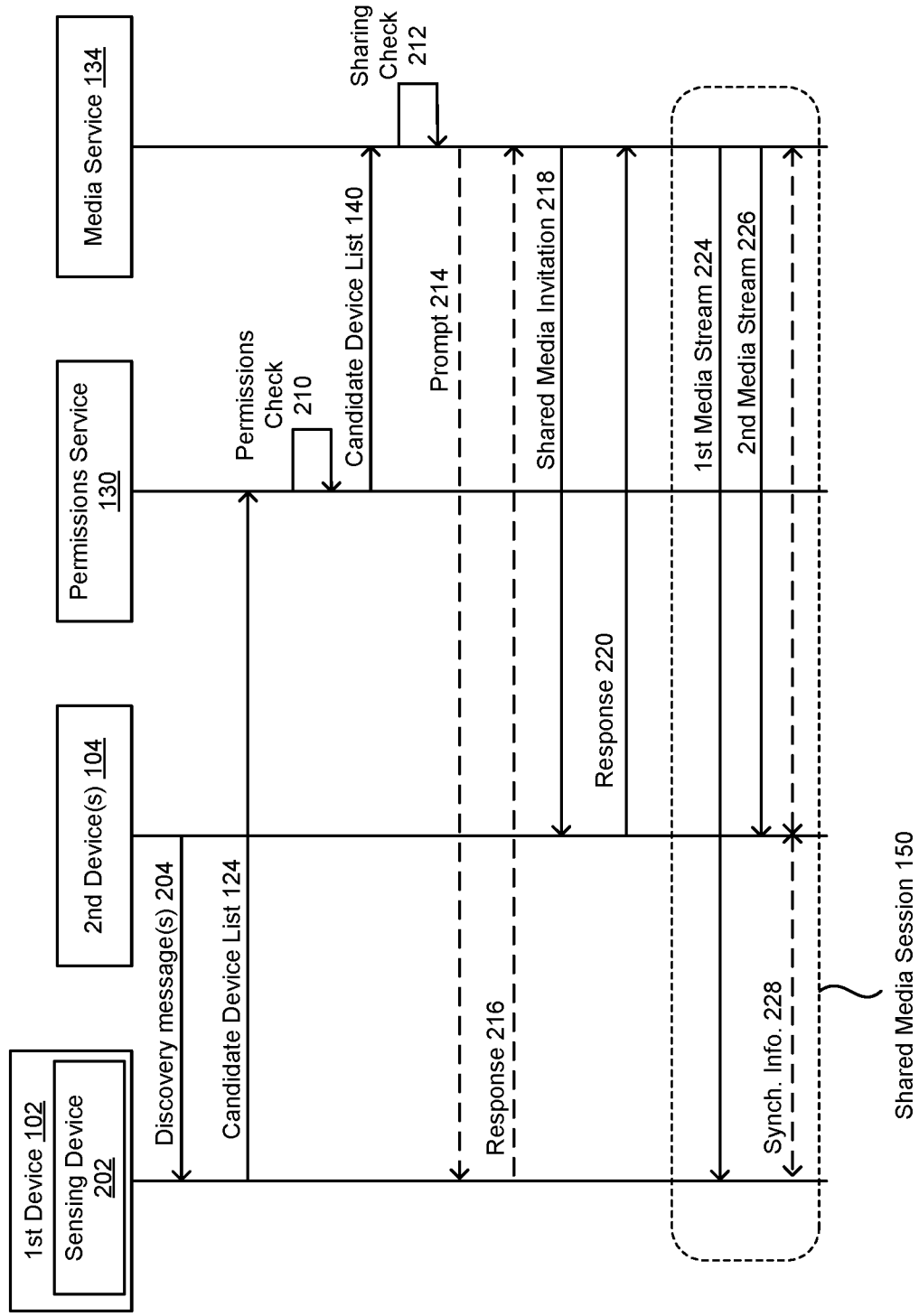
FIG. 4 is a diagram of an illustrative aspect of operations associated with establishing a shared media session between two or more devices, in accordance with some examples of the present disclosure.

FIGS. 2-4 illustrate various examples of operations associated with establishing the shared media session 150 of FIG. 1 between two or more devices in accordance with some examples of the present disclosure. Each of FIGS. 2-4 illustrates components of the system 100 to FIG. 1 including the first device 102, one or more second devices 104, the permissions service 130, and the media service 134. Additionally, a sensing device 202 is illustrated in each of FIGS. 2-4. The first device 102, the one or more second devices 104, the permissions service 130, the media service 134, and the sensing device 202 include features and components as described with reference to FIG. 1 and are configured to operate as described with reference to FIG. 1.

Referring to FIG. 2, an implementation is illustrated in which the sensing device 202 is separate from the first device 102. In the implementation illustrated in FIG. 2, the second device(s) 104 transmit discovery messages 204 that are received by the sensing device 202. Optionally, the first device 102 also transmits discovery messages 206 that are received by the sensing device 202. In FIG. 2, the sensing device 202 identifies nearby devices based on the discovery messages 204 and optionally based on the discovery messages 206 and sends the candidate device list 124 to the permissions service 130. The permissions service 130 performs a permissions check 210 based on device identifiers in the candidate device list 124 and permissions associated with the first device 102. Based on the permissions check 210, the permissions service 130 sends the candidate device list 140 to the media service 134.

The media service 134 performs a sharing check 212 based on the candidate device list 140. For example, the sharing check 212 may include determining whether any device on the candidate device list 140 is associated with a user account at the media service 134. Additionally, or alternatively, the sharing check 212 may include determining whether sharing conditions associated with the first device 102, the second device(s) 104, or both, are satisfied. For example, the sharing conditions may be specified in user configurable settings (e.g., filter settings) that indicate whether the user has sharing enabled, and if so, under what conditions sharing can be initiated. If the sharing check 212 indicates that sharing is permitted, the media service 134 may begin the process of trying to initiate the shared media session 150.

Optionally (e.g., based on specific configuration of the media service 134 or sharing permissions of the first device 102), the media service 134 sends a prompt 214 requesting approval to initiate the shared media session to the first device 102 to determine whether a user of the first device 102 would like to initiate the shared media session 150. The user of the first device 102 may cause the first device 102 to transmit a response 216 to the prompt 214 to the media service 134 to indicate whether to start the shared media session 150, sharing conditions associated with the shared media session 150, etc.

Based on the response 216, results of the sharing check 212, or both, the media service 134 transmits a shared media invitation 218 to one or more of the second device(s) 104. The second device(s) 104 may transmit a response 220 to the shared media invitation 218 to the media service 134. The media service 134 initiates the shared media session 150 based on the response 220 indicating approval to initiate the shared media session 150.

In some implementations, the media service 134 is configured to send the shared media invitation 218 to the second device 104 even if the second device 104 is not associated with a user account of the media service 134. In such implementations, the shared media invitation 218 may also include an invitation to create a user account with the media service 134, an invitation to use the media service temporarily without creating a user account, an invitation to download and install an application (e.g., a media player) associated with the media service 134, or any combination thereof. For example, when the second device 104 is not associated with a user account at the media service 134, the shared media invitation 218 may include a link to download the application associated with the media service 134.

In a particular implementation, the shared media session 150 includes one or more media streams communicated via wireless transmissions. For example, in FIG. 2, the shared media session includes a first media stream 224 transmitted by the media service 134 to the first device 102 and a second media stream 226 transmitted by the media service 134 to the second device 104. When more than one second device 104 is joined to the shared media session 150, the media service 134 transmits more than one second media stream 226, such as one second media stream 226 for each of the second devices 104. In some implementations, the first media stream 224 corresponds to media content (e.g., streaming audio) that the user of the first device 102 was already consuming prior to initiating the shared media session 150 (e.g., prior to discovery of the proximity of the second device 104), and upon initiating the shared media session 150, transmission of the second media stream 226 to the second device 104 is initiated. In some other implementations, transmission of the first media stream 224 and the second media stream 226 are initiated substantially simultaneously.

Optionally, synchronization information 228 is transmitted during the shared media session 150. The synchronization information 228 may be communicated between the sensing device 202 and either or both of the first device 102 and the second device(s) 104, between the first device 102 and each of the second device(s) 104, between the media service 134 and devices 102, 104, or from another device to the devices 102, 104.

In some implementations, the first device 102 receives the first media stream 224 via a first network, and the second device 104 receives the second media stream 226 via a second network. For example, the first device 102 may receive the first media stream 224 via a WiFi connection to the wireless access point 110 of FIG. 1, and the second device 104 may receive the second media stream 226 via a Bluetooth connection to the portable communication device 106. The synchronization information 228 may be configured to facilitate contemporaneous output of the media content despite differences in delay times associated with the different networks and/or differences in delay times associated with rendering of the media content by the first and second devices 102, 104. For example, the synchronization information 228 may include time-to-play data that indicates a target output time of particular portions (e.g., frames) of the media content. In this example, each of the first and second devices 102, 104 renders the media content for output such that the media content is presented to the user at a time-to-play time indicated by the time-to-play data. In such implementations, the synchronization information 228 may also include signals that enable the first and second devices 102, 104 to establish a common clock to align the playout times.

Referring to FIG. 3, another implementation is illustrated in which the sensing device 202 is separate from the first device 102. In the implementation illustrated in FIG. 3, the second device(s) 104 transmit discovery messages 204 that are received by the sensing device 202. Optionally, the first device 102 may also transmit discovery messages that are received by the sensing device 202. In FIG. 3, the sensing device 202 identifies nearby devices based on the discovery messages 204 and sends a list of nearby devices 302 to the first device 102. In FIG. 3, the first device 102 generates the candidate device list 124 based on the list of nearby devices 302 and user configuration settings of the first device 102 and sends the candidate device list 124 to the permissions service 130. In the example illustrated in FIG. 3, after the first device 102 sends the candidate device list 124 to the permissions service 130, the operations continue as described with reference to FIG. 2.

Referring to FIG. 4, an implementation is illustrated in which the sensing device 202 is integrated with the first device 102. In the implementation illustrated in FIG. 4, the second device(s) 104 transmit the discovery messages 204 that are received by the sensing device 202 of the first device 102. In FIG. 4, the sensing device 202 identifies nearby devices based on the discovery messages 204, and the first device 102 generates the candidate device list 124 based on the nearby devices and user configuration settings of the first device 102. The first device 102 sends the candidate device list 124 to the permissions service 130. In the example illustrated in FIG. 4, after the first device 102 sends the candidate device list 124 to the permissions service 130, the operations continue as described with reference to FIG. 2.

FIG. 5 is a block diagram illustrating aspects of the first device 102 of FIG. 1, which is operable to establish a shared media session with one or more other devices (such as the one or more second devices 104 of FIGS. 1-4) in accordance with some examples of the present disclosure. In the example illustrated in FIG. 5, the first device 102 is an earbud with onboard components 500 that include one or more processors 590, memory 520, and a portable power supply 592. Additionally, the onboard components 500 include one or more input interfaces 514, one or more output interfaces 516, and one or more transceivers ("XCVR" in FIG. 5), such as a first transceiver 530 and a second transceiver 532. The processor(s) 590 are configured to execute instructions 522 from the memory 520 to perform one or more operations described with reference to FIGS. 1-4. Although FIG. 5 illustrates an example of the first device 102, in some implementations, the one or more second devices 104 of FIGS. 1-4 are configured in a similar manner. Further, although FIG. 5 illustrates the onboard components 500 integrated within an earbud, in other examples, the onboard components 500 are integrated within another device, such as another wearable device, a vehicle, etc., as described with reference to any of FIGS. 9-16.

In the example illustrated in FIG. 5, operating system components are illustrated with hatching and other components are illustrated without crosshatching. For example, operating system components of the first device 102 may include platform services 540, user verification service 554, and a wake word framework 556. In this example, the platform services 540 include a user interface (UI) manager 542 that includes a media engine 544 configured to render media content for output via the output interface(s) 516. The platform services 540 also include a connection manager 546 that includes a discovery manager 548. The discovery manager 548 is configured to initiate, control, or perform discovery operations, to generate or update the candidate device list 124, to update discovery parameters 528, or a combination thereof.

The user verification service 554 may be configured to identify and/or authenticate particular users and to determine permissions (e.g., access permissions, usage permissions, etc.) associated with the users. For example, the user verification service 554 may store or have access to verification data, such as biometric data, speech profiles, passwords, other information or settings, or any combination thereof, that the user verification service 554 uses to identify users of the first device 102. In this example, the verification data may be mapped to or associated with permissions data indicating actions that each user is permitted to perform, configuration settings 526 associated with each user, data access permissions, etc.

The wake word framework(s) 556 are operable to detect wake words in user speech received via one or more microphones 502 and to enable other operations responsive to detecting the wake words. In some implementations, the wake word framework(s) 556 operate on a low-power or always-on processing island and are configured to initiate operations at a high-power processing island when a wake word is detected. Additionally, or alternatively, the wake word framework(s) 556 provide data based on user input to one or more voice assistants 552, 568, based on the specific wake word detected. To illustrate, in FIG. 5, the processor(s) 590 are configured to execute voice assistant(s) 552 as part of a set of embedded services 550, and to execute voice assistant(s) 568 via application programming interface(s) (APIs) 564. In this illustrative example, the voice assistant(s) 552, 568 may be associated with different wake words, and the wake word framework 556 is configured to provide information or instructions to each voice assistant 552, 568 based on the specific wake word detected.

In the example illustrated in FIG. 5, the embedded services 550 are closely coupled to components of the operating system. However, in FIG. 5, the processor(s) 590 may also be able to execute downloaded application(s) 560 that may be less closely coupled to the operating system. Some of the downloaded application(s) 560A are customized to directly interface with components of the operating system. The API(s) 564 facilitate execution of downloaded application(s) 560B that are not customized to directly interface with components of the operating system. For example, the voice assistant(s) 568 of the API(s) 564 may be configured to generate instructions, data, or both, to control operations of specific ones of the downloaded application(s) 560B. To illustrate, the downloaded application(s) 560A may include a first media sharing application 570A, and the downloaded application(s) 560B may include a second media sharing application 570B. In this illustrative example, a user can control the first media sharing application 570A or the second media sharing application 570B using voice commands. When the user wants to provide a voice command, the user speaks a wake word, such as "hey earbud", and follows the wake word with a voice command, such as "play music from MusicSource," where "MusicSource" is used as an example of a downloaded application 560 associated with a media service (e.g., the media service 134 of FIG. 1) In this example, the wake word framework(s) 556 detect the wake word and, based on detecting the wake word, send the voice command to the voice assistant(s) 568. The voice assistant(s) 568 perform various speech recognition operations to convert the voice commands into text and perform natural-language processing operations to parse the text. In this example, based on parsing the text, the voice assistant(s) 568 determine that the voice command is directed to the MusicSource downloaded application, and generate instructions to open and execute the MusicSource downloaded application. If the voice command includes additional information, such as a specific media content item that Music-Source was to play, the voice assistant(s) 568 would also generate a command that was interpretable by the Music-Source downloaded application to play the specified media content item.

The input interface(s) 514 are coupled to or include one or more input devices, such as the microphone(s) 502, one or more buttons, one or more switches, one or more keyboards, one or more pointing devices, one or more touch screens, etc. The output interface(s) 516 are coupled to or include one or more output devices, such as one or more speakers 504, one or more display screens, one or more haptic devices, etc.

In the example illustrated in FIG. 5, the first transceiver 530, the second transceiver 532, or both, are configured to communicate with one or more remote devices 508, one or more local devices 510, or both. Additionally, although FIG. 5 illustrates two transceivers 530, 532, in other examples the first device 102 includes more than two transceivers or fewer than two transceivers. For example, in some implementations, the first device 102 includes a single transceiver that is configured to communicate using two or more different communications protocols, using two or more distinct frequencies, etc. To illustrate, a single transceiver can be coupled to two or more different antennas in order to send and receive wireless signals in two or more different frequency bands. In a particular implementation, the transceivers 530, 532, in conjunction with the discovery manager 548, correspond to the sensing device 202 of FIGS. 2-4.

The discovery manager 548 is operable to control operation of the transceivers 530, 532 to perform one or more discovery processes based on discovery parameters 528. For example, during a particular discovery interval, the discovery manager 548 may cause the first transceiver 530 to wake up to listen for discovery messages. Additionally or alternatively, the discovery manager 548 may cause the first transceiver 530 to transmit one or more discovery messages. Further, during a second discovery interval, the discovery manager 548 may cause the second transceiver 532 to wake up to listen for discovery messages and/or to transmit discovery messages. The discovery manager 548 determines when to start each discovery interval, a duration of the discovery interval, operations to be performed during the discovery interval, or a combination thereof, based on the discovery parameters 528. In a particular aspect, a discovery interval associated with the first transceiver 530 may be different than a discovery interval associated with the second transceiver 532.

In a particular implementation, the discovery manager 548 updates or modifies the discovery parameters 528 based on context of the first device 102. For example, the context associated with the first device 102 may include whether the first device 102 is joined to a shared media session. To illustrate, when the first device 102 is not participating in a shared media session, the discovery manager 548 may set the discovery parameters 528 such that the first transceiver 530, the second transceiver 532, or both, perform discovery operations at a first rate, and when the first device 102 is participating in a shared media session, the discovery manager 548 may set the discovery parameters 528 such that the first transceiver 530, the second transceiver 532, or both, perform discovery operations at a second rate. In this example, the second rate may be slower than the first rate. For example, the first device 102 may perform discovery operations less frequently when joined to the shared media session 150 of FIGS. 1-4 than when the first device 102 is not joined to the shared media session 150.

In addition to updating the discovery parameters 528, the discovery manager 548 may be configured to periodically or occasionally update a determined context of the first device 102. For example, the discovery manager 548 may update the context at a first rate when the first device 102 is not participating in a shared media session and may update the context at a second rate when the first device 102 is participating in a shared media session. In this example, the second rate may be slower than the first rate, such that the context is updated less frequently when the first device 102 is participating in a shared media session 150. In other examples, other contextual information may be used to determine how frequently the context of the first device 102 is updated. To illustrate, a rate at which the context of the first device 102 is updated may be related to a battery power level of a battery of the first device 102.

Figure 6:
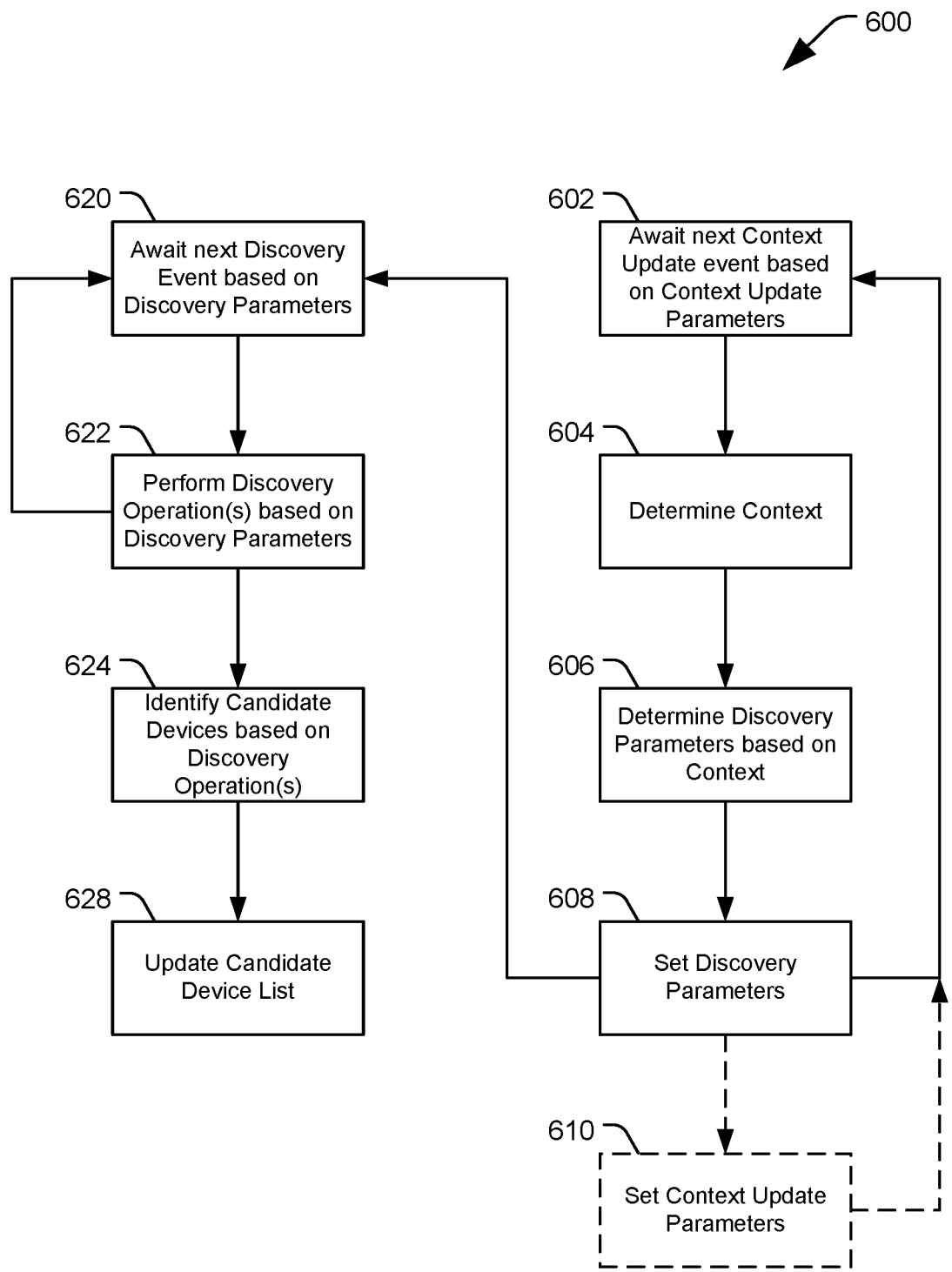
FIG. 6 is a diagram of an illustrative aspect of operation of components of the device of FIG. 5, in accordance with some examples of the present disclosure.

FIG. 6 is a diagram illustrating aspects of operations 600 of components of the first device 102 of FIG. 5 in accordance with some examples of the present disclosure. In particular, FIG. 6 illustrates examples of operation of the discovery manager 548. In the example illustrated in FIG. 6, the operations 600 may be performed by the discovery manager 548 separately for each transceiver of the first device 102. For example, when the first device 102 includes two transceivers as illustrated in FIG. 5, the operations 600 may be performed independently for each of the two transceivers.

The operations 600 include, at block 604, determining context associated with the first device 102. For example, the context may include a location of the first device 102, whether the first device 102 is participating in a shared media session, configuration settings 526 of the first device 102, a power level of a battery of the first device 102, other information, or a combination thereof.

The operations 600 also include, at block 606, determining discovery parameters (e.g., the discovery parameters 528) based on the context. For example, the discovery parameters may indicate a time interval between iterations of discovery operations. In some implementations, the discovery parameters may indicate whether the discovery operations are passive (e.g., listening for discovery packets from other devices), active (e.g., transmitting discovery packets), or both.

The operations 600 also include, at block 608, setting the discovery parameters. For example, setting the discovery parameters may include storing one or more values of the discovery parameters in the memory 520 of FIG. 5. In another example, the discovery parameters 528 may be provided to another component of the discovery manager 548, such as a component of the discovery manager 548 that controls the discovery operations.

In FIG. 6, the operations 600 optionally include, at block 610, setting context update parameters. The context update parameters indicate a rate at which the discovery manager 548 determines the context of the first device 102. For example, when the first device 102 is participating in a shared media session, the context update parameters may indicate a first context update interval that is different than a second context update interval used when the first device 102 is not participating in a shared media session. Additionally or alternatively, the context update interval maybe set based on a type of media content being shared via the shared media session. To illustrate, when the content shared via the shared media session is music, a first context update interval may be used and when the content shared via the shared media session is video, a second context update interval may be used. The context update intervals may be selected to provide a relatively uninterrupted user experience based on an expected duration of the content shared via the shared media session. For example, a shared media session including a movie would be expected to be longer than a shared media session including a particular song. Accordingly in this example, a longer context update interval may be used when the shared media session includes a movie than a context interval used when the shared media session includes a song.

The operations 600 also include, at block 602, awaiting a next context update event based on the context update parameters. When the next context update event is detected, the operations 600 include performing another iteration of determining the context and setting the discovery parameters based on the context.

In FIG. 6, the operations 600 also include, at block 620, awaiting a next discovery event based on the discovery parameters. In response to occurrence of the next discovery event, the operations 600 include, at block 622, performing discovery operations based on the discovery parameters. For example, the discovery operations may include transmitting one or more discovery packets, receiving one or more discovery packets, or both.

The operations 600 further include, at block 624, identifying one or more candidate devices based on the discovery operations. The candidate devices include nearby devices discovered via the discovery operations. The operations 600 also include, at block 628, updating the candidate device list. For example, one or more of the candidate devices may be added to the candidate device list. As another example, when a particular device that was previously on the candidate device list is no longer detected by the discovery operations, the candidate device list may be updated to remove the particular device.

Depending on the configuration settings 526 of the first device 102, the candidate device list is subsequently transmitted, via the permissions service 130, to the media service 134 to determine whether to initiate a shared media session.

Figure 7:
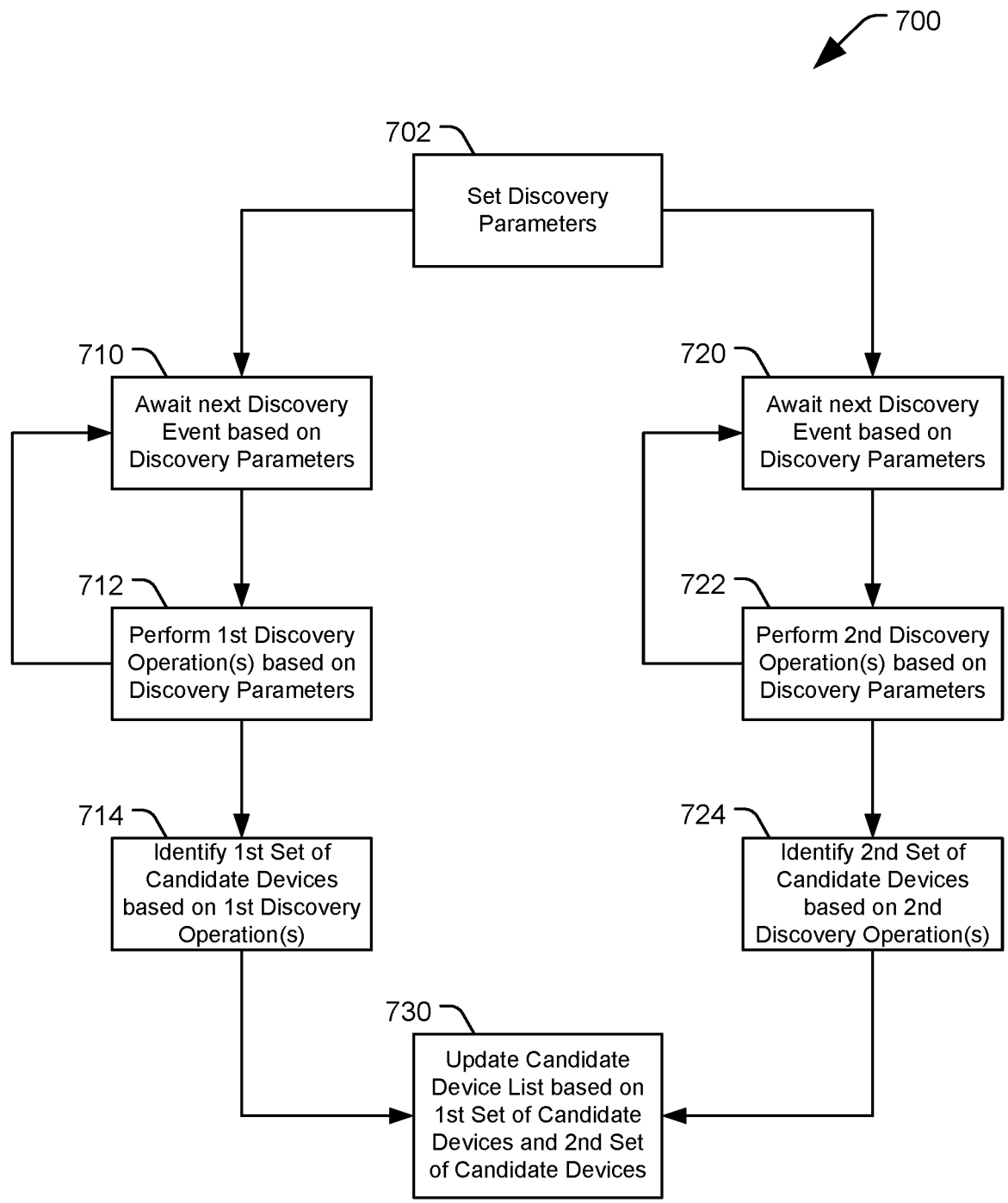
FIG. 7 is a diagram of an illustrative aspect of operation of components of the device of FIG. 5, in accordance with some examples of the present disclosure.

FIG. 7 is a diagram illustrating aspects of operations 700 of components of the first device 102 of FIG. 5 in accordance with some examples of the present disclosure. In particular, FIG. 7 illustrates examples of operation of the discovery manager 548. In the example illustrated in FIG. 7, the operations 700 enable discovery manager 548 to manage two transceivers, such as the first transceiver 530 and the second transceiver 532 of FIG. 5.

The operations 700 include, at block 702, setting the discovery parameters. In a particular implementation, the discovery parameters are set based on the context of the first device 102, as described with reference to FIG. 6.

In FIG. 7, the operations 700 also include, at block 710, awaiting a next discovery event associated with a first transceiver based on the discovery parameters. In response to occurrence of the next discovery event, the operations 700 include, at block 712, performing first discovery operations. The first discovery operations use the first transceiver and are based on the discovery parameters associated with the first transceiver. For example, the first discovery operations may include transmitting one or more discovery packets from the first transceiver, receiving one or more discovery packets by the first transceiver, or both.

The operations 700 further include, at block 714, identifying a first set of candidate devices based on the first discovery operations. The first set of candidate devices include nearby devices discovered by the first transceiver via the first discovery operations.

Additionally, in FIG. 7, the operations 700 include, at block 720, awaiting a next discovery event associated with a second transceiver based on the discovery parameters. In response to occurrence of the next discovery event, the operations 700 include, at block 722, performing second discovery operations. The second discovery operations use the second transceiver and are based on the discovery parameters associated with the second transceiver, which may be distinct from the discovery parameters associated with the first transceiver. For example, an interval between discovery events associated with the first transceiver may be different from an interval between discovery events associated with the second transceiver. The second discovery operations may include transmitting one or more discovery packets from the second transceiver, receiving one or more discovery packets by the second transceiver, or both.

The operations 700 further include, at block 724, identifying a second set of candidate devices based on the second discovery operations. The second set of candidate devices include nearby devices discovered by the second transceiver via the second discovery operations.

The operations of blocks 710, 712, 714 may be performed asynchronously (e.g., in parallel and according to an independent schedule) with operations of blocks 720, 722, 724. Additionally, while FIG. 7 illustrates operations 700 associated with management of two transceivers, when the first device 102 includes more than two transceivers, the operations 700 may include additional sequences of operations similar to the operations performed in blocks 710, 712, 714 for each of the additional transceivers.

The operations 700 also include, at block 730, updating the candidate device list based on the first set of candidate devices and the second set of candidate devices. For example, candidate devices from either the first set of candidate devices or the second set of candidate devices may be added to or removed from the candidate device list. In some implementations, a particular device may be included in both the first set of candidate devices and the second set of candidate devices, in which case the particular device is included only once on the candidate device list.

Depending on the settings 526 of the first device 102, the updated candidate device list is subsequently transmitted, via the permissions service 130, to the media service 134 to determine whether to initiate a shared media session.

Figure 8:
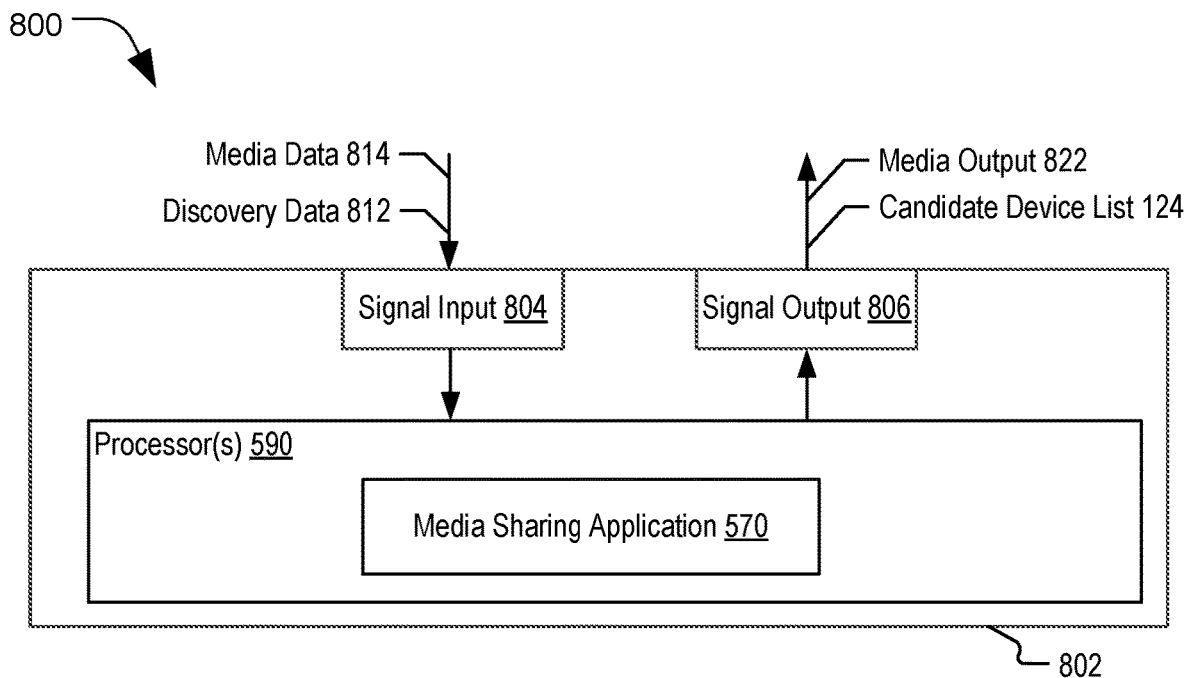
FIG. 8 illustrates an example of an integrated circuit operable to establish a shared media session with one or more other devices, in accordance with some examples of the present disclosure.

FIG. 8 depicts an implementation 800 of the first device 102 as an integrated circuit 802 that includes the one or more processors 590. The integrated circuit 802 also includes a signal input 804, such as one or more bus interfaces, to enable the data to be received for processing. For example, the processor(s) 590 may receive discovery data 812, media data 814, or both, via the signal input 804. In this example, the discovery data 812 includes information descriptive of one or more nearby devices, such as information determined by the discovery manager 548 of FIG. 5, or information determined based on the discovery message(s) 122 of FIG. 1 or the discovery message(s) 204 of FIG. 2-4. The media data 814 includes or corresponds to the media data 142 or 144 of FIG. 1 or other content of the shared media session 150 of FIGS. 1-4, such as content of the first media stream 224, the second media stream 226, or the synchronization information 228.

The integrated circuit 802 also includes a signal output 806, such as a bus interface, to enable sending of output signals from the processor(s) 590 to other devices. For example, in FIG. 8, the output signals include the candidate device list 124 and media output 822. The media output 822 may include or correspond to rendered media content that is provided to an output device, such as the speaker 504, for presentation to a user.

Figure 12:
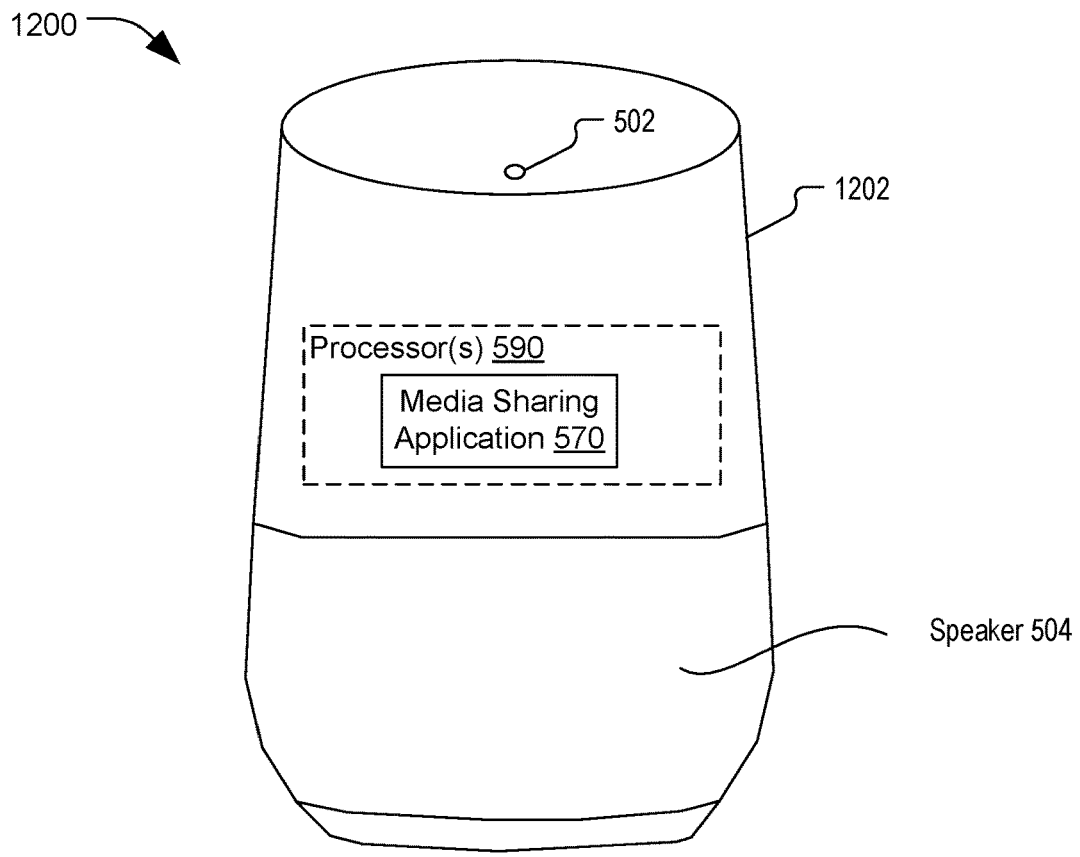
FIG. 12 is a diagram of a voice-controlled speaker system operable to establish a shared media session with one or more other devices, in accordance with some examples of the present disclosure.
Figure 13:
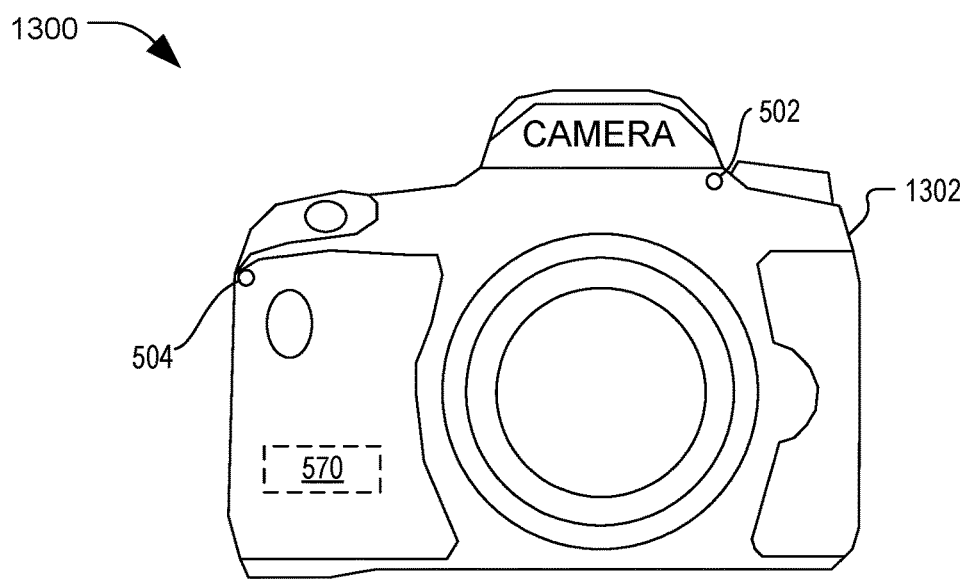
FIG. 13 is a diagram of a camera operable to establish a shared media session with one or more other devices, in accordance with some examples of the present disclosure.
Figure 14:
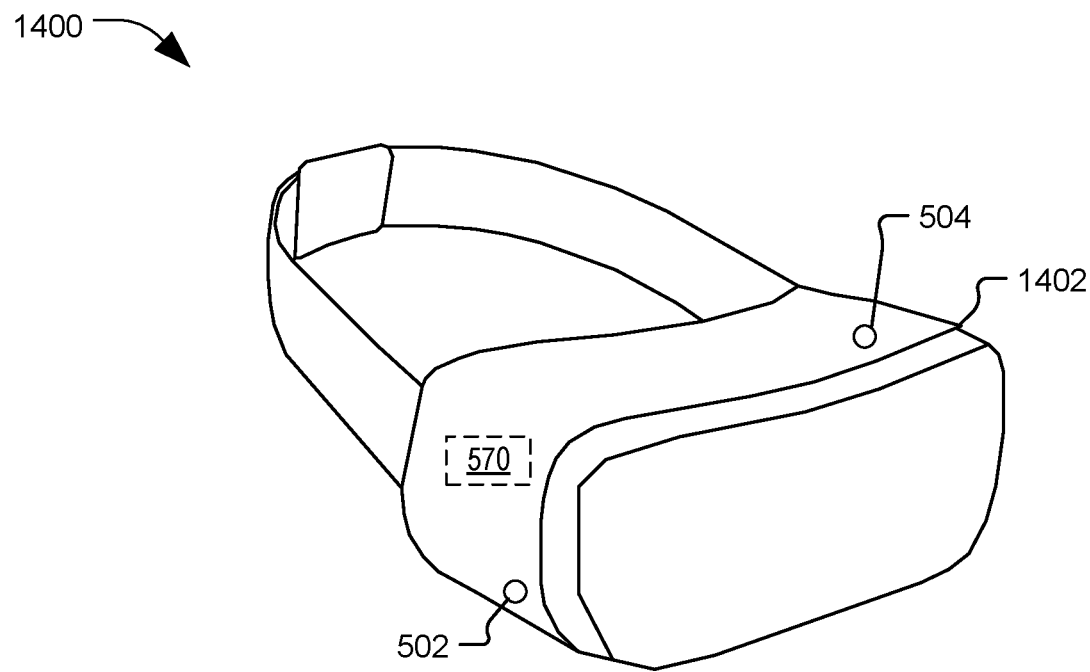
FIG. 14 is a diagram of a headset, such as a virtual reality, mixed reality, or augmented reality headset, operable to establish a shared media session with one or more other devices, in accordance with some examples of the present disclosure.
Figure 15:
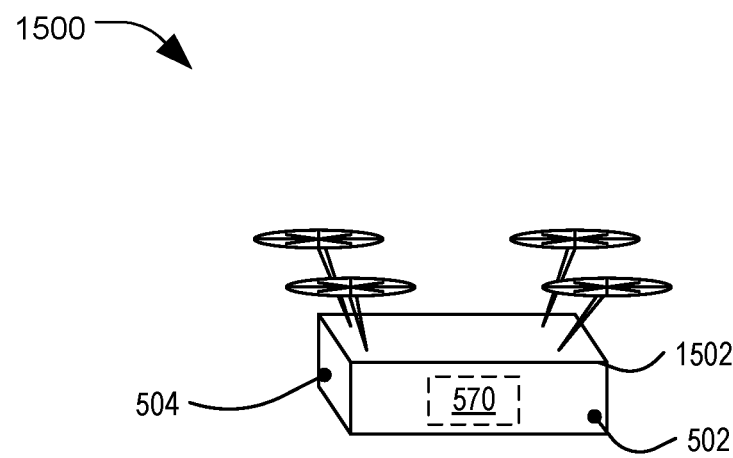
FIG. 15 is a diagram of a first example of a vehicle operable to establish a shared media session with one or more other devices, in accordance with some examples of the present disclosure.
Figure 16:
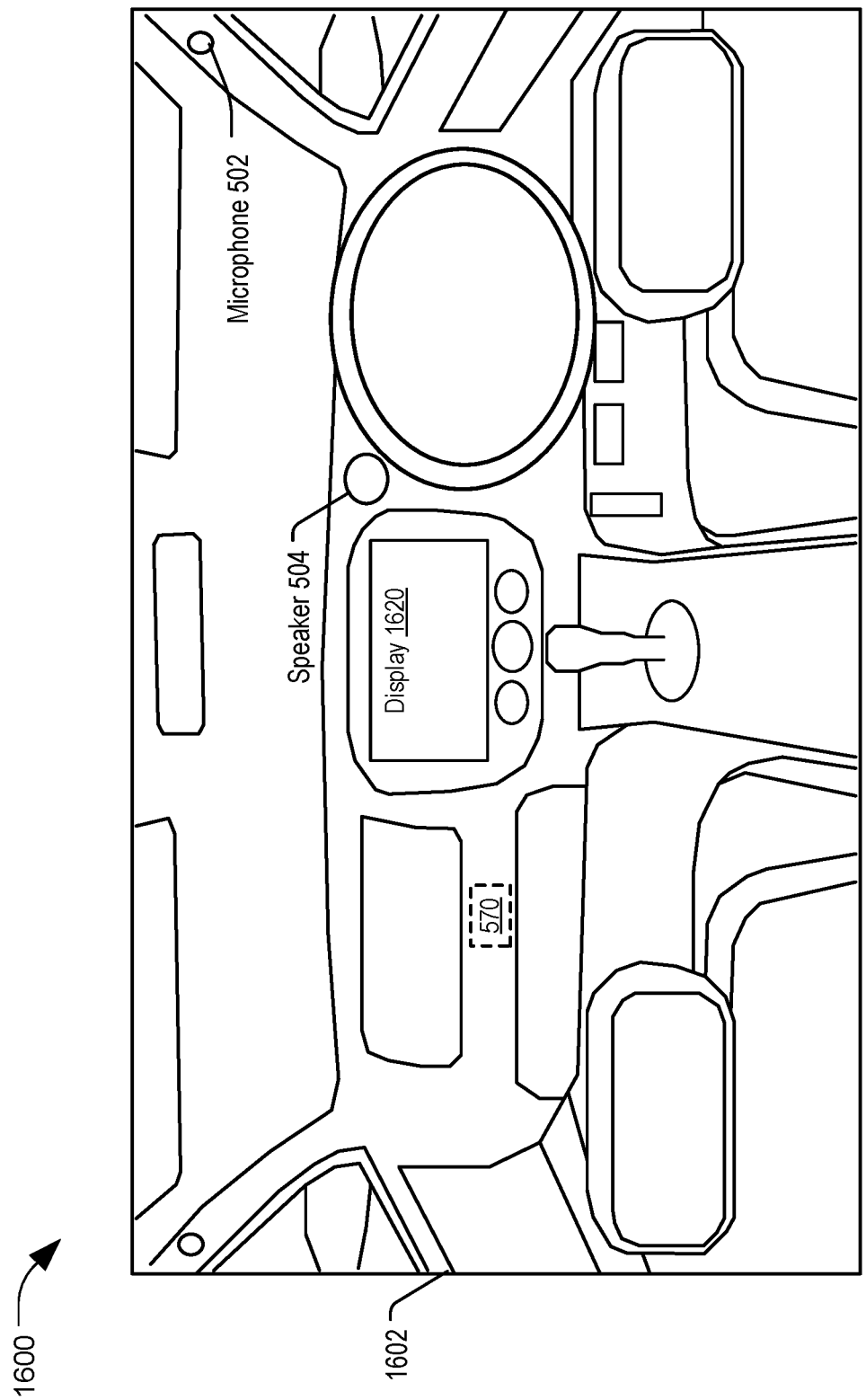
FIG. 16 is a diagram of a second example of a vehicle operable to establish a shared media session with one or more other devices, in accordance with some examples of the present disclosure.

The processor(s) 590 include the media sharing application 570 to enable the integrated circuit 802 to initiate, perform, or control one or more operations to establish a shared media session between two or more devices. As such, the integrated circuit 802 can be included as a component in a device that is operable to perform media sharing, such as earbuds as depicted in FIGS. 1 and 5, a mobile phone or tablet as depicted in FIG. 9, a headset as depicted in FIG. 10, a wearable electronic device as depicted in FIG. 11, a voice-controlled speaker system as depicted in FIG. 12, a camera as depicted in FIG. 13, a virtual reality, mixed reality, or augmented reality headset as depicted in FIG. 14, or a vehicle as depicted in FIG. 15 or FIG. 16.

Figure 9:
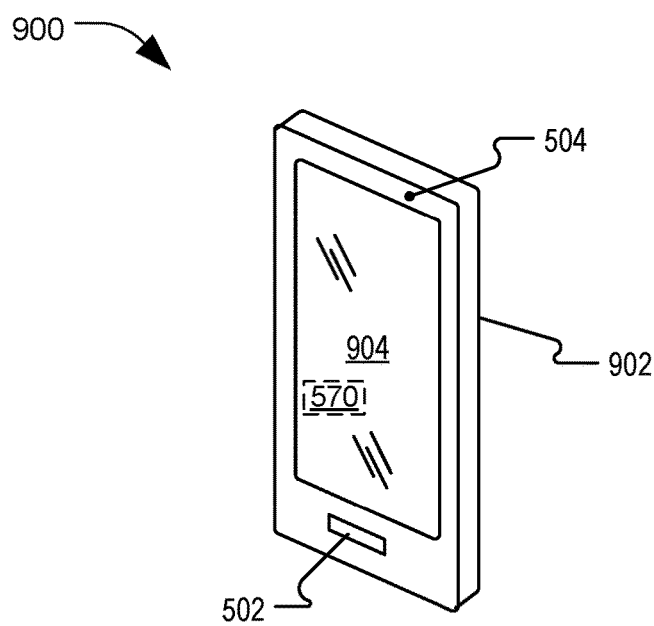
FIG. 9 is a diagram of a mobile device operable to establish a shared media session with one or more other devices, in accordance with some examples of the present disclosure.

FIG. 9 depicts an implementation 900 in which the first device 102 includes a mobile device 902, such as a phone or tablet, as illustrative, non-limiting examples. The mobile device 902 includes the microphone 502, the speaker 504, and a display screen 904. One or more of the onboard components 500 of FIG. 5, including the media sharing application 570, are integrated in the mobile device 902 and are illustrated using dashed lines to indicate internal components that are not generally visible to a user of the mobile device 902. In a particular example, the media sharing application 570 is operable to interact with other components of the mobile device 902, such as the onboard components 500, to interact with a media service to establish and conduct a shared media session with another device. In some implementations, the speaker 504, the display screen 904, or both, can be used to facilitate setup of the shared media session, consumption of media content via the shared media session, or both. For example, prompts related to setting up the shared media session can be displayed to a user via the display screen 904 or presented as audio output from the speaker 504. In this example, the user can provide responses to such prompts via soft buttons presented via the display screen 904, via voice commands detected by the microphone 502, or both. As another example, video of the media content of the shared media session can be displayed to the user via the display screen 904, and audio of the media content of the shared media session can be output by the speaker 504.

Figure 10:
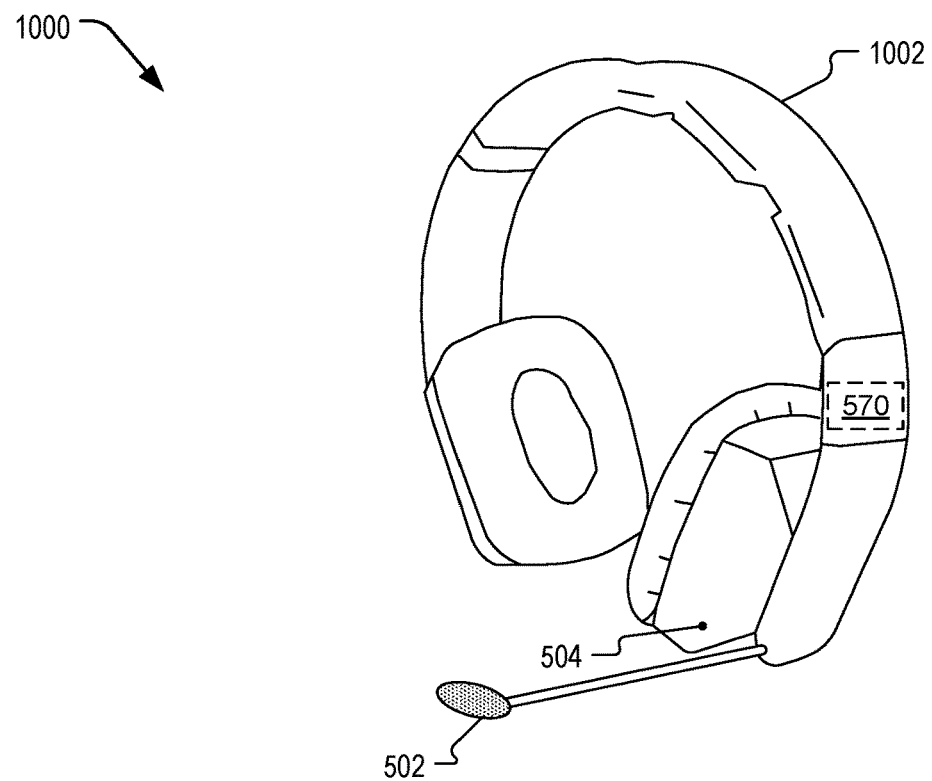
FIG. 10 is a diagram of a headset operable to establish a shared media session with one or more other devices, in accordance with some examples of the present disclosure.

FIG. 10 depicts an implementation 1000 in which the first device 102 includes a headset device 1002. The headset device 1002 includes the microphone 502 and the speaker 504. One or more of the onboard components 500 of FIG. 5, including the media sharing application 570, are integrated in the headset device 1002. In a particular example, the media sharing application 570 is operable to interact with other components of the headset device 1002, such as the onboard components 500, to interact with a media service to establish and conduct a shared media session with another device. In some implementations, the speaker 504 and the microphone 502 can be used to facilitate set up of the shared media session, consumption of media content via the shared media session, or both. For example, prompts related to setting up the shared media session can be presented as audio output from the speaker 504. In this example, the user can provide responses to such prompts via buttons on the headset device 1002, via voice commands detected by the microphone 502, or both. As another example, audio of the media content of the shared media session can be output by the speaker 504.

Figure 11:
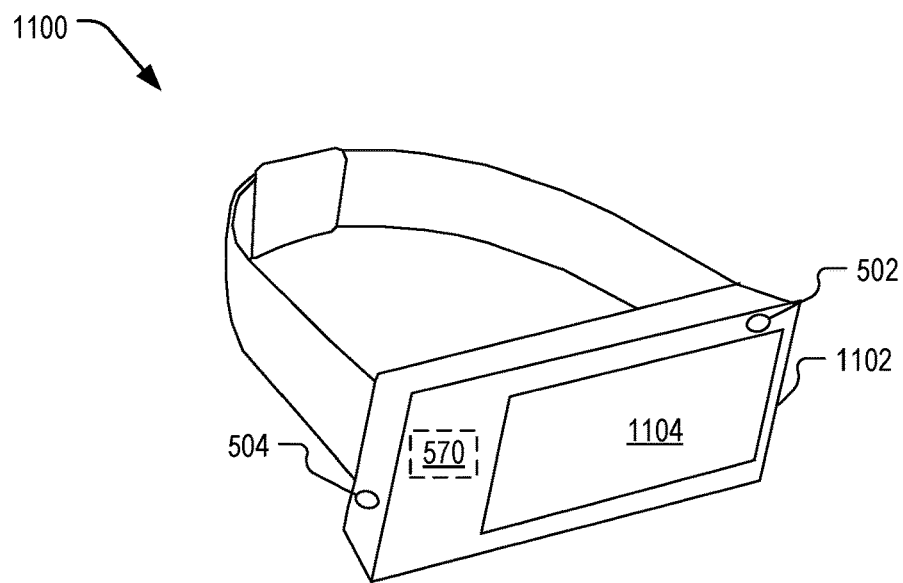
FIG. 11 is a diagram of a wearable electronic device operable to establish a shared media session with one or more other devices, in accordance with some examples of the present disclosure.

FIG. 11 depicts an implementation 1100 in which the first device 102 includes a wearable electronic device 1102, illustrated as a "smart watch." The wearable electronic device 1102 includes the microphone 502, the speaker 504, and a display screen 1104. One or more of the onboard components 500 of FIG. 5, including the media sharing application 570, are integrated in the wearable electronic device 1102. In a particular example, the media sharing application 570 is operable to interact with other components of the wearable electronic device 1102, such as the onboard components 500, to interact with a media service to establish and conduct a shared media session with another device. In some implementations, the speaker 504, the display screen 1104, or both, can be used to facilitate set up of the shared media session, consumption of media content via the shared media session, or both. For example, prompts related to setting up the shared media session can be displayed to a user via the display screen 1104 or presented as audio output from the speaker 504. In this example, the user can provide responses to such prompts via soft buttons presented via the display screen 1104, via voice commands detected by the microphone 502, or both. As another example, video of the media content of the shared media session can be displayed to the user via the display screen 1104, and audio of the media content of the shared media session can be output by the speaker 504.

FIG. 12 is an implementation 1200 in which the first device 102 includes a wireless speaker and voice activated device 1202. The wireless speaker and voice activated device 1202 can have wireless network connectivity and is configured to execute an assistant operation. The wireless speaker and voice activated device 1202 includes the speaker 504 and the microphone 502. One or more of the onboard components 500 of FIG. 5, including the media sharing application 570, are integrated in the wireless speaker and voice activated device 1202. In a particular example, the media sharing application 570 is operable to interact with other components of the wireless speaker and voice activated device 1202, such as the onboard components 500, to interact with a media service to establish and conduct a shared media session with another device. In some implementations, the speaker 504 and the microphone 502 can be used to facilitate set up of the shared media session, consumption of media content via the shared media session, or both. For example, prompts related to setting up the shared media session can be presented as audio output from the speaker 504. In this example, the user can provide responses to such prompts via voice commands detected by the microphone 502. As another example, audio of the media content of the shared media session can be output by the speaker 504. The wireless speaker and voice activated device 1202 is also configured to perform other assistant operations, such as adjusting a temperature, playing music, turning on lights, etc. For example, the assistant operations are performed responsive to receiving a command after a keyword or key phrase (e.g., "hello assistant").

FIG. 13 depicts an implementation 1300 in which the first device 102 includes a portable electronic device that corresponds to a camera device 1302. The camera device 1302 includes the microphone 502, the speaker 504, and may also include display device (e.g., on a side of the camera device 1302 that is not visible in FIG. 13). One or more of the onboard components 500 of FIG. 5, including the media sharing application 570, are integrated in the camera device 1302. In a particular example, the media sharing application 570 is operable to interact with other components of the camera device 1302, such as the onboard components 500, to interact with a media service to establish and conduct a shared media session with another device. In some implementations, the speaker 504, the display screen, or both, can be used to facilitate set up of the shared media session, consumption of media content via the shared media session, or both. For example, prompts related to setting up the shared media session can be displayed to a user via the display screen or presented as audio output from the speaker 504. In this example, the user can provide responses to such prompts via soft buttons presented via the display screen, via physical buttons of the camera device 1302, via voice commands detected by the microphone 502, or a combination thereof. As another example, video of the media content of the shared media session can be displayed to the user via the display screen, and audio of the media content of the shared media session can be output by the speaker 504.

FIG. 14 depicts an implementation 1400 in which the first device 102 includes a portable electronic device that corresponds to a virtual reality, mixed reality, or augmented reality headset 1402. The headset 1402 includes the microphone 502, the speaker 504 and visual interface device is positioned in front of the user's eyes to enable display of augmented reality, mixed reality, or virtual reality images or scenes to the user while the headset 1402 is worn. One or more of the onboard components 500 of FIG. 5, including the media sharing application 570, are integrated in the headset 1402. In a particular example, the media sharing application 570 is operable to interact with other components of the headset 1402, such as the onboard components 500, to interact with a media service to establish and conduct a shared media session with another device. In some implementations, the speaker 504, the visual interface device, or both, can be used to facilitate set up of the shared media session, consumption of media content via the shared media session, or both. For example, prompts related to setting up the shared media session can be displayed to a user via the visual interface device or presented as audio output from the speaker 504. In this example, the user can provide responses to such prompts via soft buttons presented via the visual interface device, via voice commands detected by the microphone 502, or both. As another example, video of the media content of the shared media session can be displayed to the user via the visual interface device, and audio of the media content of the shared media session can be output by the speaker 504.

FIG. 15 depicts an implementation 1500 in which the first device 102 corresponds to, or is integrated within, a vehicle 1502, illustrated as a manned or unmanned aerial device (e.g., a package delivery drone). The vehicle 1502 includes the microphone 502 and the speaker 504. User voice activity detection can be performed based on audio signals received from the microphone 502 of the vehicle 1502, such as for delivery instructions from an authorized user of the vehicle 1502. Additionally, one or more of the onboard components 500 of FIG. 5, including the media sharing application 570, are integrated in the vehicle 1502. In a particular example, the media sharing application 570 is operable to interact with other components of the vehicle 1502, such as the onboard components 500, to interact with a media service to establish and conduct a shared media session with another device. In some implementations, the speaker 504 can be used to facilitate set up of the shared media session, consumption of media content via the shared media session, or both. For example, prompts related to setting up the shared media session can be presented as audio output from the speaker 504. In this example, the user can provide responses to such prompts via voice commands detected by the microphone 502. As another example, audio of the media content of the shared media session can be output by the speaker 504

FIG. 16 depicts another implementation 1600 in which the first device 102 corresponds to, or is integrated within, a vehicle 1602, illustrated as a car. The vehicle 1602 includes the microphone 502, the speaker 504, and a display screen 1620. In some implementations, the microphone 502 is positioned to capture utterances of an operator or a passenger of the vehicle 1602. User voice activity detection can be performed based on audio signals received from the microphone 502.

One or more of the onboard components 500 of FIG. 5, including the media sharing application 570, are integrated in the vehicle 1602. In a particular example, the media sharing application 570 is operable to interact with other components of the vehicle 1602, such as the onboard components 500, to interact with a media service to establish and conduct a shared media session with another device (e.g., another vehicle or a wearable device of a user). In some implementations, the speaker 504, the display screen 1620, or both, can be used to facilitate set up of the shared media session, consumption of media content via the shared media session, or both. For example, prompts related to setting up the shared media session can be displayed to a user via the display screen 1620 or presented as audio output from the speaker 504. In this example, the user can provide responses to such prompts via soft buttons presented via the display screen 1620, via physical buttons of the vehicle 1602 (e.g., steering wheel mounted buttons or dashboard buttons), via voice commands detected by the microphone 502, or a combination thereof. As another example, video of the media content of the shared media session can be displayed to the user via the display screen 1620, and audio of the media content of the shared media session can be output by the speaker 504

Figure 17:
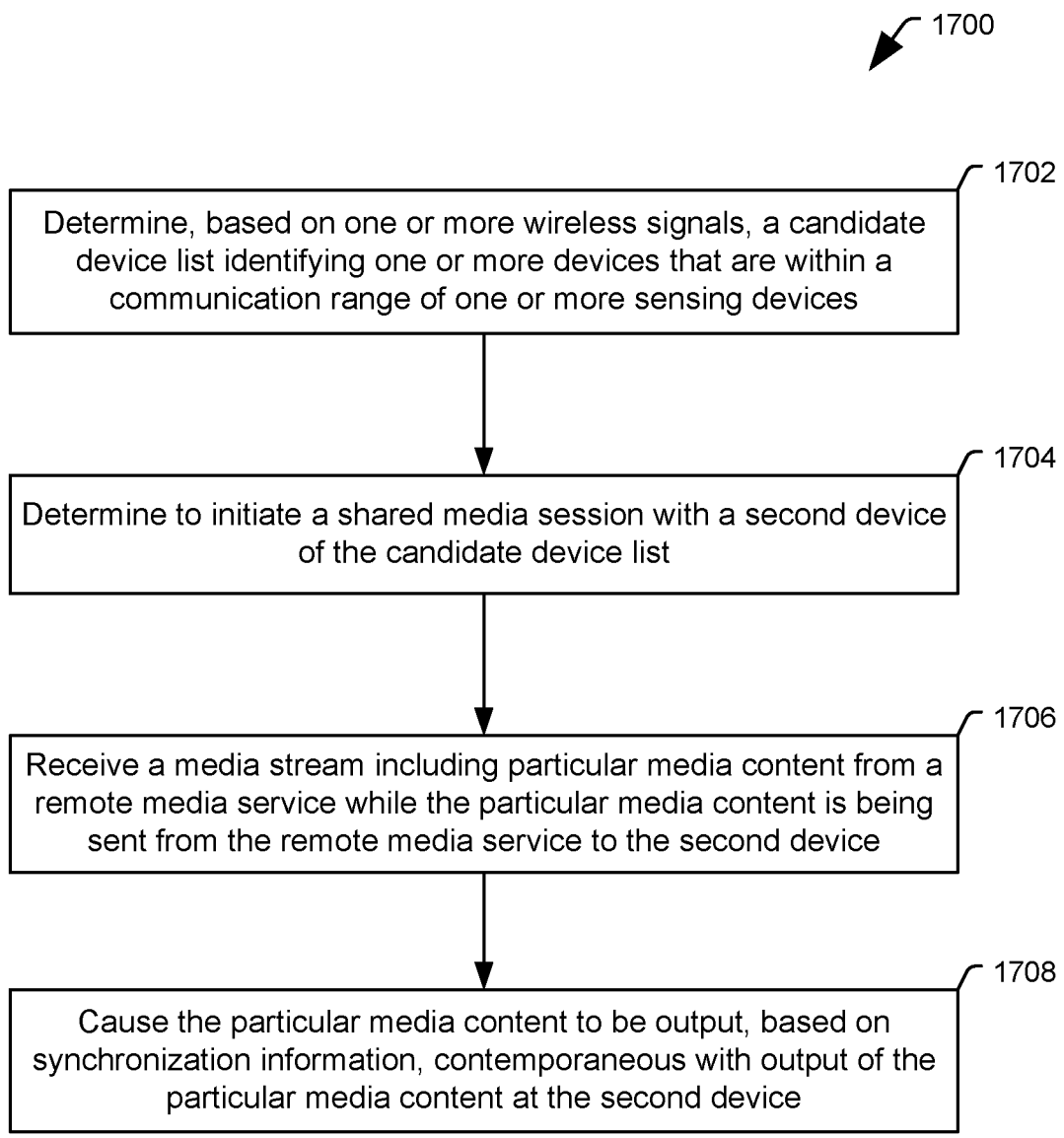
FIG. 17 is flow chart of a particular implementation of a method of establishing a shared media session between two or more other devices that may be performed by the system of FIG. 1, in accordance with some examples of the present disclosure.

Referring to FIG. 17, a particular implementation of a method 1700 of establishing a shared media session is shown. In a particular aspect, one or more operations of the method 1700 are performed by at least one of the first device 102 or the second device 104 of FIGS. 1-4, the onboard components 500 or the processor(s) 590 of FIG. 5, the system 100 of FIG. 1, or a combination thereof.

The method 1700 includes, at block 1702, determining, based on one or more wireless signals, a candidate device list (e.g., the candidate device list 124 of FIG. 1) identifying one or more devices that are within a communication range of one or more sensing devices. For example, in some implementations, the method 1700 includes receiving, via a first transceiver, first wireless signals according to a first communication protocol and determining a first set of candidate devices that are within a first communication range of the first transceiver based on the first wireless signals. In this example, the candidate device list identifies the first set of candidate devices. Further, in some such implementations, the method 1700 includes receiving second wireless signals according to a second communication protocol and determining a second set of candidate devices that are within a second communication range of a second transceiver based on the second wireless signals. In such implementations, the candidate device list identifies the first set of candidate devices and the second set of candidate devices.

In some implementations, the method 1700 includes communicating with the one or more sensing devices to determine the candidate device list. For example, the one or more sensing devices may include one or more portable communication device (e.g., the portable communication device 106 of FIG. 1), a wireless access point (e.g., the wireless access point 110 of FIG. 1), one or more other devices, or a combination thereof. In some implementations, the method 1700 includes selectively determining whether to activate a first sensing device based, at least in part, on whether a second sensing device is accessible. For example, the first sensing device may be internal to the first device and coupled to a first portable power supply of the first device, and the second sensing device is external to the first device and not coupled to the first portable power supply of the first device.

In some implementations, the method 1700 includes determining whether a particular device is within the communication range of the one or more sensing devices based on a distance metric indicating an estimated distance between the particular device and at least one of the one or more sensing devices. In the same or different implementations, the method 1700 includes determining whether a particular device is within the communication range of the one or more sensing devices based, at least in part, on received signal strength of a transmission from the particular device. In the same or different implementations, the method 1700 includes determining whether a particular device is within the communication range of the one or more sensing devices based, at least in part, on location coordinates of the particular device.

The method 1700 includes, at block 1704, determining to initiate a shared media session with a second device of the candidate device list. In some implementations, the determination of whether to initiate the shared media session is based, at least in part, on one or more permissions lists associated with the first device, the second device, or both. For example, the shared media session may be initiated based on a determination that the second device is identified on a permissions list associated with the remote media service. In this example, the permissions list associated with the remote media service may include a list of device associated with user accounts at the media service. Additionally, or alternatively, the permissions list associated with the remote media service may include a list of device from a user of the first device and stored that a server of the media service, where the list indicates devices that the user has approved for media sharing.

In some implementations, the first device can initiate the shared media session. In such implementations, based on the determination to initiate the shared media session with the second device, the method 1700 includes causing a sharing invitation to be transmitted to the second device. For example, the first device 102 may instruct the media service 1340 of FIG. 1 to send the sharing invitation to the second device 104. The sharing invitation may identify particular media content to be shared during the shared media session. Additionally, or alternatively, the sharing invitation may identify the first device, a user associated with the first device, or both. In some implementations, the sharing invitation includes a resource address associated with the shared media session.

In some implementations, the second device can initiate the shared media session, in which case the first device may receive a sharing invitation from the remote media service, and the shared media session can be initiated based on transmission, by the first device, of a sharing acceptance message to the remote media service. In such implementations, the sharing invitation may include a resource address associated with the shared media session, and the sharing acceptance message may include a request to access the resource address.

The method 1700 includes, at block 1706, receiving a media stream including particular media content from a remote media service while the particular media content is being sent from the remote media service to the second device, and at block 1708, causing the particular media content to be output, based on synchronization information, contemporaneous with output of the particular media content at the second device. In a particular implementation, at least a portion of the synchronization information is received at the first device from the remote media service, from the second device, or from another device that includes a synchronization signal generator. The media content includes or corresponds to audio content, game content, video content, extended reality content, or a combination thereof.

The method 1700 of FIG. 17 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 1700 of FIG. 17 may be performed by a processor that executes instructions, such as described with reference to FIG. 20.

Figure 18:
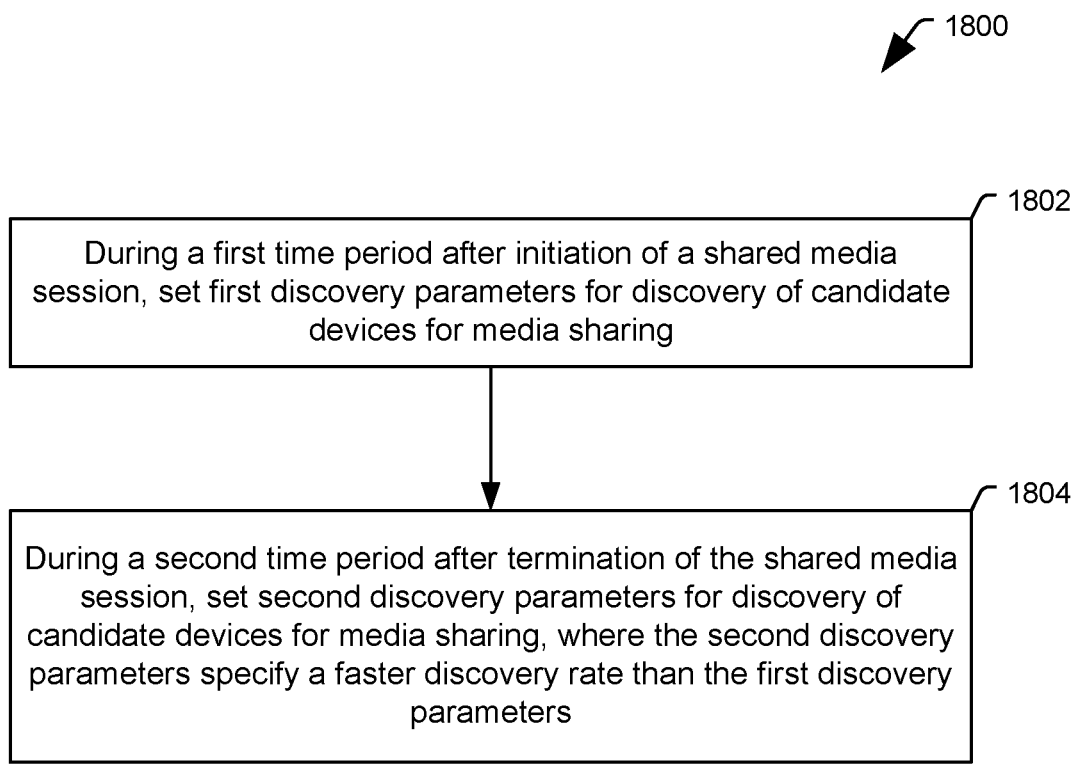
FIG. 18 is flow chart of a particular implementation of a method of establishing a shared media session between two or more other devices that may be performed by the system of FIG. 1, in accordance with some examples of the present disclosure.

Referring to FIG. 18, a particular implementation of a method 1800 of establishing a shared media session is shown. In a particular aspect, one or more operations of the method 1800 are performed by at least one of the first device 102 or the second device 104 of FIGS. 1-4, the onboard components 500 or the processor(s) 590 of FIG. 5, the system 100 of FIG. 1, or a combination thereof.

The method 1800 includes, at block 1802, during a first time period after initiation of a shared media session, setting first discovery parameters for discovery of candidate devices for media sharing. In a particular implementation, the shared media session may be established as described with reference to FIG. 17, FIG. 19, or both. The shared media session may include, for example, the first media stream 224 to the first device 102 and the second media stream 226 to the second device 104, as illustrated in FIGS. 2-4. In this example, the first media stream 224 and the second media stream 226 include the same media content (e.g., the same song, the same movie, etc.). In addition to the media content of the shared media session, synchronization information associated with a shared media session may be sent to the first device, the second device, or both. For example, the first device 102 may send synchronization information to the second device 104. As another example, the second device 104 may send synchronization information to the first device 102. As still another example, another local or remote device may send the synchronization information to the first device 102 and the second device 104.

The method 1800 includes, at block 1804, during a second time period after termination of the shared media session, setting second discovery parameters for discovery of candidate devices for media sharing. The second discovery parameters specify a faster discovery rate than the first discovery parameters.

In some implementations, the shared media session is associated with a particular media content item, and the shared media session is terminated based on reaching an end of the particular media content item. In other implementations, the shared media session is associated with a plurality of media content items of a media stream, and the shared media session is terminated when the media stream is terminated.

In some implementations, the first discovery parameters specify no discovery during the shared media session. In such implementations, when the first device is participating in a shared media session, the first device does not send discovery messages, does not receive discovery messages, or both. In some implementations, the first discovery parameters specify a first time interval between iterations of discovery operations and the second discovery parameters specify a second time interval between iterations of the discovery operations. In such implementations, the first time interval is generally significantly longer that the second time interval, such as at least ten times longer than the second time interval, at least one hundred times longer than the second time interval, or at least one thousand times longer than the second time interval.

During the first time period, during the second time period, or both, the method 1800 may include initiating one or more discovery processes, based on current discovery parameters, to determine a candidate device list identifying one or more devices that are within a communication range of a sensing device. The candidate device list may be used to determine whether to add devices to a shared media session, remove devices from a shared media session, whether to initiate a shared media session, etc. For example, during the first time period (e.g., when the first device is participating in the shared media session), the method 1800 may include initiating a determination of whether to invite one or more of the candidate devices to be added to the shared media session or initiating a determination of whether to drop a particular device from the shared media session. As another example, during the second time period (e.g., after the shared media session is terminated), the method 1800 may include initiating a determination of whether to initiate a second shared media session with one or more of the candidate devices. In some implementations, the method 1800 also includes determining differences between the candidate device list and a prior candidate device list. In such implementations, a determination of whether to initiate or terminate a shared media session may be based on the differences.

In some implementations, the method 1800 includes receiving, based on current discovery parameters, first wireless signals according to a first communication protocol to discover first candidate devices for media sharing, and receiving, based on the current discovery parameters, second wireless signals according to a second communication protocol to discover second candidate devices for media sharing. In such implementations, the method 1800 includes determining a candidate device list based on the first candidate devices and the second candidate devices.

The method 1800 of FIG. 18 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 1800 of FIG. 18 may be performed by a processor that executes instructions, such as described with reference to FIG. 20.

Figure 19:
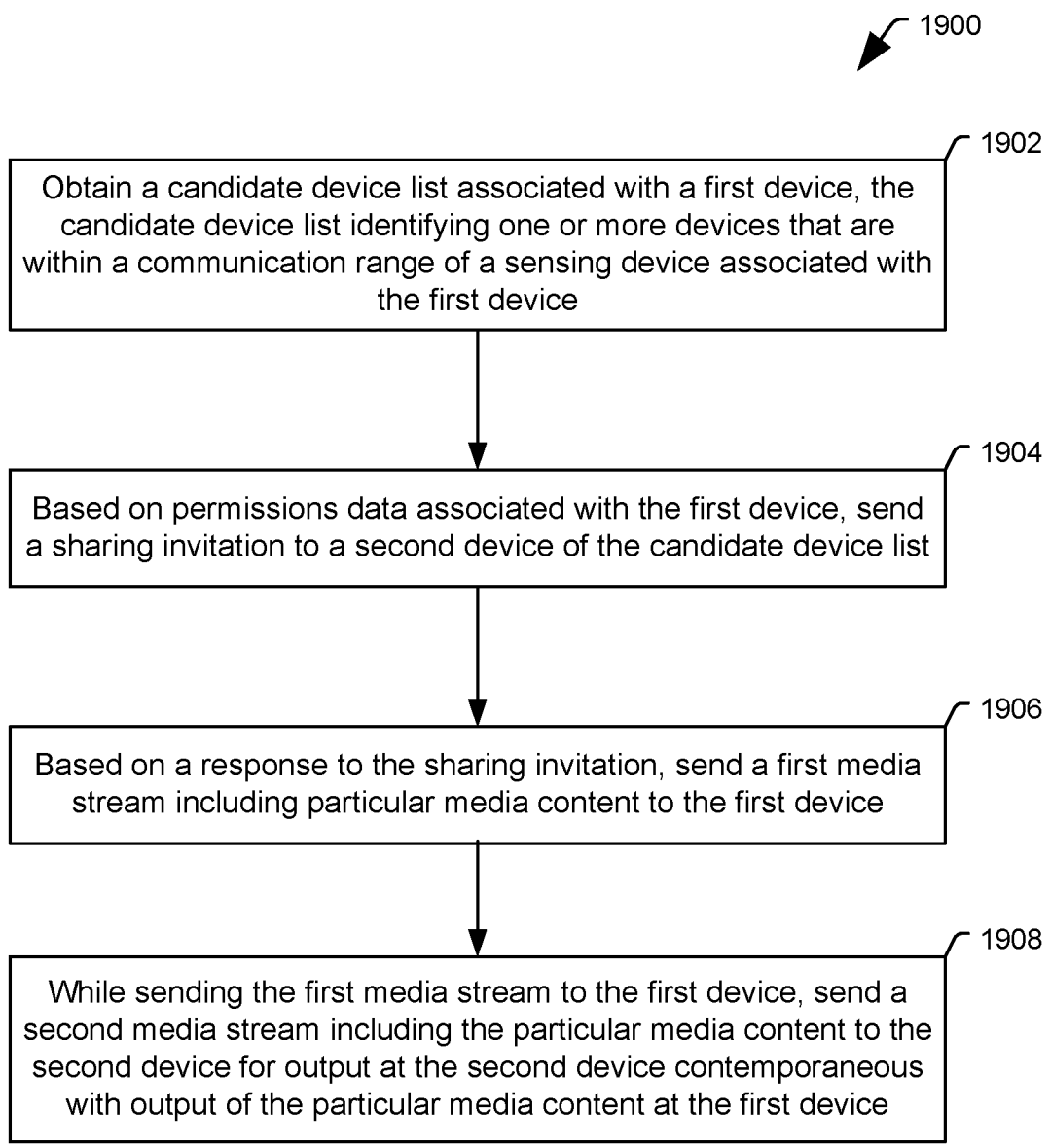
FIG. 19 is flow chart of a particular implementation of a method of establishing a shared media session between two or more other devices that may be performed by the system of FIG. 1, in accordance with some examples of the present disclosure.

Referring to FIG. 19, a particular implementation of a method 1900 of establishing a shared media session is shown. In a particular aspect, one or more operations of the method 1900 are performed by one or more devices of the system 100 of FIG. 1, such as by the server(s) 136 of the media service 134, the server(s) 132 of the permissions service 130, or a combination thereof.

The method 1900 includes, at block 1902, obtaining a candidate device list associated with a first device. The candidate device list identifies one or more devices that are within a communication range of a sensing device associated with the first device. For example, the candidate device list may be determined based on one or more of the wireless signals 120 of FIG. 1. In this example, the wireless signals 120 may include discovery messages (such as the discovery message(s) 122 of FIG. 1 or the discovery messages 204, 206 of FIGS. 2-4). The wireless signals 120 may be used to determine that one or more devices are nearby (e.g., within the communication range of the sensing device). Proximity of a "nearby" device may be determined based on a location coordinates of the device, based on received signal strength of signals from the device, etc.

In some implementations, the first device or the sensing device sends a candidate device list to a permissions service, and the permissions service verifies that devices on the candidate device list are approved for sharing based on permissions associated with the first device. In such implementations, the permissions service sends a candidate device list that identifies approved devices to a media service. For example, the permissions service 130 of FIG. 1 receives the candidate device list 124 and uses the candidate device list 124 to generate the candidate device list 140, which is sent to the media service 134.

The method 1900 includes, at block 1904, based on permissions data associated with the first device, sending a sharing invitation to a second device of the candidate device list. For example, the permissions data may identify a list of devices approved for media sharing at the media service, such as devices associated with user accounts at the media service. In some implementations, the sharing invitation includes a resource address associated with a shared media session.

In some implementations, before sending the sharing invitation, the media service may be configured to send a prompt to the first device to request approval from the first device to initiate the shared media session with the second device. In such implementations, the permissions data is based at least in part on a response to the prompt. For example, if the response approves initiation of the shared media session (e.g., in response to an input of the user of the first device, such as via a speech interface or tapping a particular button of the first device), the permissions are updated to indicate that the second device is approved for media sharing, and the media service sends the sharing invitation to the second device based on the permission indicating that the second device is approved for media sharing.

The method 1900 includes, at block 1906, based on a response to the sharing invitation, sending a first media stream including particular media content to the first device, and at block 1908, while sending the first media stream to the first device, sending a second media stream including the particular media content to the second device for output at the second device contemporaneous with output of the particular media content at the first device.

For example, the shared media session may include the first media stream 224 to the first device and the second media stream 226 to the second device, as illustrated in FIGS. 2-4. In this example, the first media stream 224 and the second media stream 226 include the same media content (e.g., the same song, the same movie, etc.). In addition to the media content of the shared media session, synchronization information associated with a shared media session may be sent to the first device, the second device, or both. For example, the first device 102 may send synchronization information to the second device 104. As another example, the second device 104 may send synchronization information to the first device 102. As still another example, another local or remote device may send the synchronization information to the first device 102 and the second device 104.

The method 1900 of FIG. 19 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 1900 of FIG. 19 may be performed by a processor that executes instructions, such as described with reference to FIG. 20.

Figure 20:
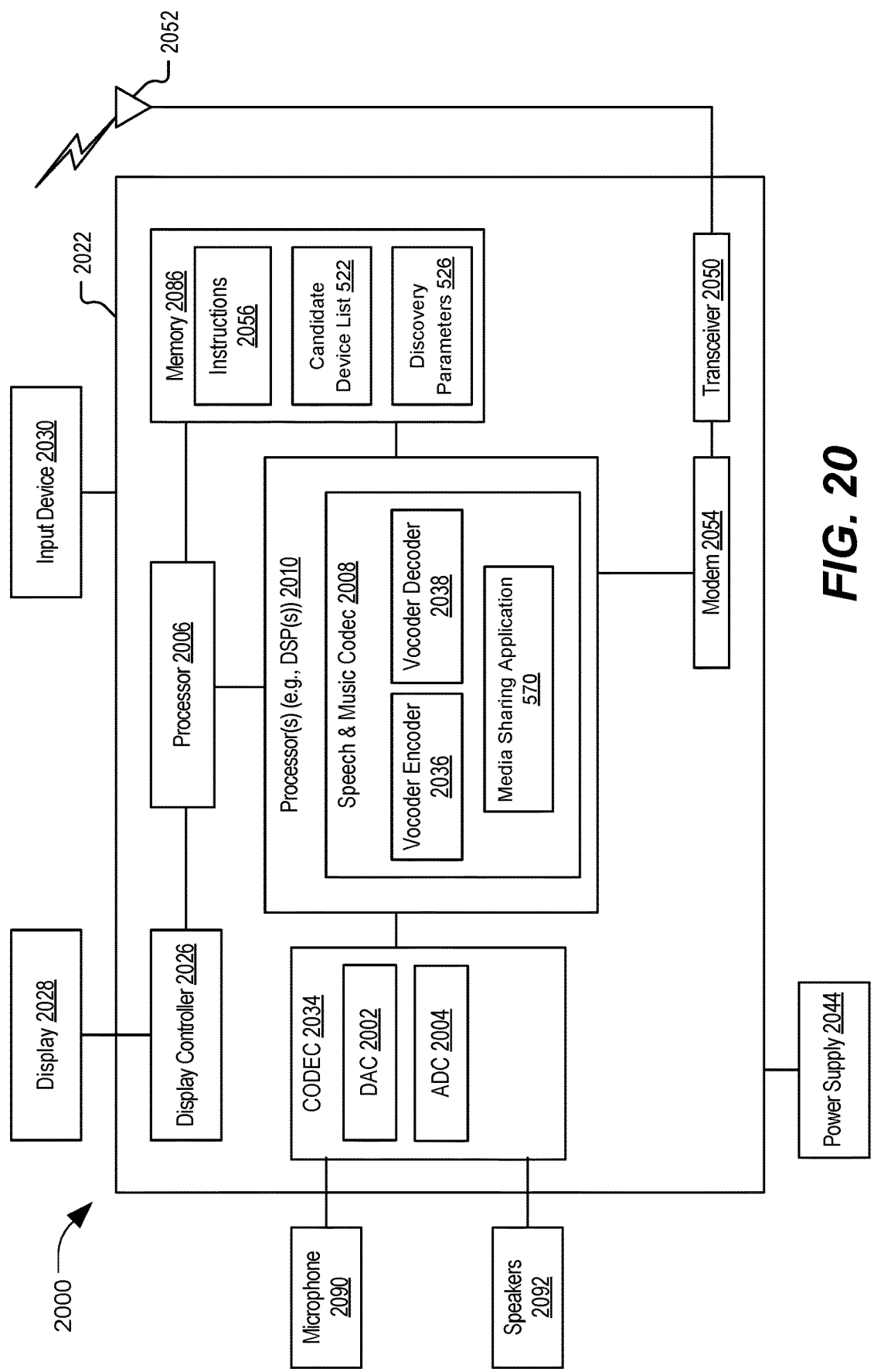
FIG. 20 is a block diagram of a particular illustrative example of a device that is operable to establish a shared media session between two or more other devices, in accordance with some examples of the present disclosure.

Referring to FIG. 20, a block diagram of a particular illustrative implementation of a device is depicted and generally designated 2000. In various implementations, the device 2000 may have more or fewer components than illustrated in FIG. 20. In an illustrative implementation, the device 2000 may correspond to the first device 102, the second device 104, the portable communication device 106, the wireless access point 110, the server(s) 132, or the servers 136 of FIG. 1 or the sensing device 202 of FIGS. 2-4. In an illustrative implementation, the device 2000 may perform one or more operations described with reference to FIGS. 1-19.

In a particular implementation, the device 2000 includes a processor 2006 (e.g., a central processing unit (CPU)). The device 2000 may include one or more additional processors 2010 (e.g., one or more DSPs). In a particular aspect, the processor(s) 590 of FIG. 5 corresponds to the processor 2006, the processors 2010, or a combination thereof. The processors 2010 may include a speech and music coder-decoder (CODEC) 2008 that includes a voice coder ("vocoder") encoder 2036, a vocoder decoder 2038, the media sharing application 570, or a combination thereof.

The device 2000 may include a memory 2086 and a CODEC 2034. The memory 2086 may include instructions 2056, that are executable by the one or more additional processors 2010 (or the processor 2006) to implement the functionality described with reference to the media sharing application 570. The device 2000 may include the modem 2054 coupled, via a transceiver 2050, to an antenna 2052.

The device 2000 may include a display 2028 coupled to a display controller 2026. A speaker 2092, a microphone 2090 may be coupled to the CODEC 2034. In some implementations, the speaker 2092 includes or corresponds to the speaker 504 of FIG. 5, and the microphone 2090 includes or corresponds to the microphone 502 of FIG. 5.

The CODEC 2034 may include a digital-to-analog converter (DAC) 2002, an analog-to-digital converter (ADC) 2004, or both. In a particular implementation, the CODEC 2034 may receive analog signals from the microphone 2090, convert the analog signals to digital signals using the analog-to-digital converter 2004, and provide the digital signals to the speech and music codec 2008. The speech and music codec 2008 may process the digital signals, and the digital signals may further be processed by the media sharing application 570. In a particular implementation, the speech and music codec 2008 may provide digital signals to the CODEC 2034. The CODEC 2034 may convert the digital signals to analog signals using the digital-to-analog converter 2002 and may provide the analog signals to the speaker 2092.

In a particular implementation, the device 2000 may be included in a system-in-package or system-on-chip device 2022. In a particular implementation, the memory 2086, the processor 2006, the processors 2010, the display controller 2026, the CODEC 2034, and the modem 2054 are included in the system-in-package or system-on-chip device 2022. In a particular implementation, an input device 2030 and a power supply 2044 (e.g., the portable power supply 592 of FIG. 5) are coupled to the system-in-package or the system-on-chip device 2022. Moreover, in a particular implementation, as illustrated in FIG. 20, the display 2028, the input device 2030, the speaker 2092, the microphone 2090, the antenna 2052, and the power supply 2044 are external to the system-in-package or the system-on-chip device 2022. In a particular implementation, each of the display 2028, the input device 2030, the speaker 2092, the microphone 2090, the antenna 2052, and the power supply 2044 may be coupled to a component of the system-in-package or the system-on-chip device 2022, such as an interface or a controller.

The device 2000 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, one or more earbuds, a computing device, a communication device, an internet-of-things (IoT) device, a virtual reality (VR) device, a base station, a mobile device, or any combination thereof.

In conjunction with the described implementations, an apparatus includes means for determining, based on one or more wireless signals, a candidate device list identifying one or more devices that are within a communication range of one or more sensing devices. For example, the means for determining the candidate device list can correspond to the system 100, the first device 102, the wireless access point 110, the server(s) 132, the sensing device 202, the onboard components 500, the processor(s) 590, the discovery manager 548, the media sharing application 570, the processor 2006, the processor(s) 2010, one or more other circuits or components configured to determine a candidate device list based on one or more wireless signals, or any combination thereof.

The apparatus also includes means for receiving, based on a determination to initiate a shared media session between a first device and a second device of the candidate device list, a media stream including particular media content from a remote media service while the particular media content is being sent from the remote media service to the second device. For example, the means for receiving the media stream can correspond to the system 100, the first device 102, the onboard components 500, the first transceiver 530, the second transceiver 532, the media engine 544, the processor(s) 590, the media sharing application 570, the processor 2006, the processor(s) 2010, the transceiver 2050, the modem 2054, one or more other circuits or components configured to receive a media stream, or any combination thereof.

The apparatus also includes means for causing the particular media content to be output, based on synchronization information, contemporaneous with output of the particular media content at the second device. For example, the means for causing the particular media content to be output contemporaneous with output of the particular media content at the second device can correspond to the system 100, the first device 102, the onboard components 500, the output interface(s) 516, the media engine 544, the processor(s) 590, the media sharing application 570, the processor 2006, the processor(s) 2010, the transceiver 2050, one or more other circuits or components configured to cause media content to be output contemporaneous with output of the media content at another device, or any combination thereof.

In conjunction with the described implementations, an apparatus includes means for, during a first time period after initiation of a shared media session, setting first discovery parameters for discovery of candidate devices for media sharing. For example, the means for setting first discovery parameters during a time period after initiation of a shared media session can correspond to the system 100, the first device 102, the sensing device 202, the onboard components 500, the processor(s) 590, the discovery manager 548, the media sharing application 570, the processor 2006, the processor(s) 2010, one or more other circuits or components configured to set discovery parameters, or any combination thereof.

The apparatus also includes means for, during a second time period after termination of the shared media session, setting second discovery parameters for discovery of candidate devices for media sharing, wherein the second discovery parameters specify a faster discovery rate than the first discovery parameters. For example, the means for setting second discovery parameters during a time period after termination of a shared media session can correspond to the system 100, the first device 102, the sensing device 202, the onboard components 500, the processor(s) 590, the discovery manager 548, the media sharing application 570, the processor 2006, the processor(s) 2010, one or more other circuits or components configured to set discovery parameters, or any combination thereof.

In conjunction with the described implementations, an apparatus includes means for obtaining a candidate device list associated with a first device, where the candidate device list identifies one or more devices that are within a communication range of a sensing device associated with the first device. For example, the means for obtaining the candidate device list can correspond to the system 100, the first device 102, the wireless access point 110, the server(s) 132, the server(s) 136, the sensing device 202, the onboard components 500, the processor(s) 590, the discovery manager 548, the media sharing application 570, the processor 2006, the processor(s) 2010, one or more other circuits or components configured to obtain a candidate device list, or any combination thereof.

The apparatus also includes means for sending a sharing invitation to a second device of the candidate device list based on permissions data associated with the first device. For example, the means for sending the sharing invitation can correspond to the system 100, the server(s) 136, the processor 2006, the processor(s) 2010, one or more other circuits or components configured to send a sharing invitation, or any combination thereof.

The apparatus also includes means for sending a first media stream including particular media content to the first device based on a response to the sharing invitation. For example, the means for sending the first media stream can correspond to the system 100, the server(s) 136, the processor 2006, the processor(s) 2010, one or more other circuits or components configured to send a first media stream, or any combination thereof.

The apparatus also includes means for sending, while sending the first media stream to the first device, a second media stream including the particular media content to the second device for output at the second device contemporaneous with output of the particular media content at the first device. For example, the means for sending the second media stream can correspond to the system 100, the server(s) 136, the processor 2006, the processor(s) 2010, one or more other circuits or components configured to send a second media stream, or any combination thereof.

In some implementations, a non-transitory computer-readable medium (e.g., a computer-readable storage device, such as the memory 520 of FIG. 5 or the memory 2086 of FIG. 20) includes instructions (e.g., the instructions 522 of FIG. 5 or the instructions 2056 of FIG. 20) that, when executed by one or more processors (e.g., the processor(s) 590 of FIG. 5, the one or more processors 2010 or FIG. 20, or the processor 2006 of FIG. 20), cause the one or more processors to determine, based on one or more wireless signals, a candidate device list identifying one or more devices that are within a communication range of one or more sensing devices. The instructions are further executable by the processor(s) to cause the processor(s) to, based on a determination to initiate a shared media session with a second device of the candidate device list, receive a media stream including particular media content from a remote media service while the particular media content is being sent from the remote media service to the second device. The instructions are further executable by the processor(s) to cause the processor(s) to cause the particular media content to be output, based on synchronization information, contemporaneous with output of the particular media content at the second device.

In some implementations, a non-transitory computer-readable medium (e.g., a computer-readable storage device, such as the memory 520 of FIG. 5 or the memory 2086 of FIG. 20) includes instructions (e.g., the instructions 522 of FIG. 5 or the instructions 2056 of FIG. 20) that, when executed by one or more processors (e.g., the processor(s) 590 of FIG. 5, the one or more processors 2010 or FIG. 20, or the processor 2006 of FIG. 20), cause the one or more processors to, during a first time period after initiation of a shared media session, set first discovery parameters for discovery of candidate devices for media sharing. The instructions are further executable by the processor(s) to cause the processor(s) to, during a second time period after termination of the shared media session, set second discovery parameters for discovery of candidate devices for media sharing, wherein the second discovery parameters specify a faster discovery rate than the first discovery parameters.

In some implementations, a non-transitory computer-readable medium (e.g., a computer-readable storage device, such as the memory 2086 of FIG. 20) includes instructions (e.g., the instructions 2056 of FIG. 20) that, when executed by one or more processors (e.g., the one or more processors 2010 or the processor 2006 of FIG. 20), cause the one or more processors to obtain a candidate device list associated with a first device, where the candidate device list identifies one or more devices that are within a communication range of a sensing device associated with the first device. The instructions are further executable by the processor(s) to cause the processor(s) to, based on permissions data associated with the first device, send a sharing invitation to a second device of the candidate device list and based on a response to the sharing invitation, send a first media stream including particular media content to the first device. The instructions are further executable by the processor(s) to cause the processor(s) to, while sending the first media stream to the first device, send a second media stream including the particular media content to the second device for output at the second device contemporaneous with output of the particular media content at the first device.

Particular aspects of the disclosure are described below in sets of interrelated Examples:

According to Example 1, a first device includes one or more processors configured to: determine, based on one or more wireless signals, a candidate device list identifying one or more devices that are within a communication range of one or more sensing devices; and based on a determination to initiate a shared media session with a second device of the candidate device list: receive a media stream including particular media content from a remote media service while the particular media content is being sent from the remote media service to the second device; and cause the particular media content to be output, based on synchronization information, contemporaneous with output of the particular media content at the second device.

Example 2 includes the first device of Example 1, further including the one or more sensing devices, wherein the one or more sensing devices include a first transceiver coupled to the one or more processors and operable to receive first wireless signals according to a first communication protocol, wherein the one or more processors are further configured to determine a first set of candidate devices that are within a first communication range of the first transceiver based on the first wireless signals, and wherein the candidate device list identifies the first set of candidate devices.

Example 3 includes the first device of Example 2, wherein the one or more sensing devices further include a second transceiver coupled to the one or more processors and operable to receive second wireless signals according to a second communication protocol, wherein the one or more processors are further configured to determine a second set of candidate devices that are within a second communication range of the second transceiver based on the second wireless signals, and wherein the candidate device list identifies the second set of candidate devices.

Example 4 includes the first device of any of Examples 1 to 3, further including one or more transceivers coupled to the one or more processors and operable to communicate with the one or more sensing devices to determine the candidate device list.

Example 5 includes the first device of Example 4, wherein the one or more sensing devices include a portable communication device.

Example 6 includes the first device of Example 4 or Example 5, wherein the one or more sensing devices include a wireless access point.

Example 7 includes the first device of any of Examples 1 to 6, further including a portable power supply coupled to the one or more processors, and wherein the one or more processors are further configured to selectively determine whether to activate a first sensing device based, at least in part, on whether a second sensing device is accessible, wherein the first sensing device is coupled to the portable power supply and the second sensing device is not coupled to the portable power supply.

Example 8 includes the first device of any of Examples 1 to 7, further including a modem coupled to the one or more processors and operable to receive the media stream via one or more wireless transmissions.

Example 9 includes the first device of any of Examples 1 to 8, wherein the shared media session is initiated based on a determination that the second device is identified on a permissions list associated with the remote media service.

Example 10 includes the first device of any of Examples 1 to 9, wherein the shared media session is initiated based on a determination that the second device is identified on a permissions list associated with the first device.

Example 11 includes the first device of any of Examples 1 to 10, wherein the shared media session is initiated based on a determination that the second device is associated with an account of the remote media service.

Example 12 includes the first device of any of Examples 1 to 11, wherein the one or more processors are further configured to determine whether a particular device is within the communication range of the one or more sensing devices based on a distance metric indicating an estimated distance between the particular device and at least one of the one or more sensing devices.

Example 13 includes the first device of any of Examples 1 to 12, wherein the one or more processors are further configured to determine whether a particular device is within the communication range of the one or more sensing devices based, at least in part, on received signal strength of a transmission from the particular device.

Example 14 includes the first device of any of Examples 1 to 13, wherein the one or more processors are further configured to determine whether a particular device is within the communication range of the one or more sensing devices based, at least in part, on location coordinates of the particular device.

Example 15 includes the first device of any of Examples 1 to 14, wherein the one or more processors are further configured to, based on the determination to initiate the shared media session with the second device, cause a sharing invitation to be transmitted to the second device.

Example 16 includes the first device of Example 15, wherein causing the sharing invitation to be transmitted to the second device includes instructing the remote media service to send the sharing invitation.

Example 17 includes the first device of Example 15 or Example 16, wherein the sharing invitation identifies the particular media content.

Example 18 includes the first device of any of Examples 15 to 17, wherein the sharing invitation identifies the first device, a user associated with the first device, or both.

Example 19 includes the first device of any of Examples 15 to 18, wherein the sharing invitation includes a resource address associated with the shared media session.

Example 20 includes the first device of any of Examples 1 to 19, wherein the one or more processors are further configured to: receive a sharing invitation from the remote media service; and based on the determination to initiate the shared media session, transmit a sharing acceptance message to the remote media service.

Example 21 includes the first device of Example 20, wherein the sharing invitation includes a resource address associated with the shared media session, and the sharing acceptance message includes a request to access the resource address.

Example 22 includes the first device of any of Examples 1 to 21, wherein the one or more processors are further configured to receive at least a portion of the synchronization information from the remote media service.

Example 23 includes the first device of any of Examples 1 to 22, wherein the one or more processors are further configured to receive at least a portion of the synchronization information from the second device.

Example 24 includes the first device of any of Examples 1 to 23, wherein the one or more processors are further configured to receive at least a portion of the synchronization information from a synchronization signal generator.

Example 25 includes the first device of any of Examples 1 to 24, wherein the particular media content corresponds to audio content.

Example 26 includes the first device of any of Examples 1 to 24, wherein the particular media content corresponds to game content.

Example 27 includes the first device of any of Examples 1 to 24, wherein the particular media content corresponds to video content.

Example 28 includes the first device of any of Examples 1 to 24, wherein the particular media content corresponds to extended reality content.

According to Example 29, a method includes: determining, by one or more processors of a first device and based on one or more wireless signals, a candidate device list identifying one or more devices that are within a communication range of one or more sensing devices; and based on a determination to initiate a shared media session with a second device of the candidate device list: receiving, by the one or more processors, a media stream including particular media content from a remote media service while the particular media content is being sent from the remote media service to the second device; and causing the particular media content to be output, based on synchronization information, contemporaneous with output of the particular media content at the second device.

Example 30 includes the method of Example 29, further including: receiving, via a first transceiver, first wireless signals according to a first communication protocol; and determining a first set of candidate devices that are within a first communication range of the first transceiver based on the first wireless signals, wherein the candidate device list identifies the first set of candidate devices.

Example 31 includes the method of Example 30, further including: receiving second wireless signals according to a second communication protocol; and determining a second set of candidate devices that are within a second communication range of a second transceiver based on the second wireless signals, wherein the candidate device list identifies the second set of candidate devices.

Example 32 includes the method of any of Examples 29 to 31, further including communicating with the one or more sensing devices to determine the candidate device list.

Example 33 includes the method of Example 32, wherein the one or more sensing devices include a portable communication device.

Example 34 includes the method of Example 32 or Example 33, wherein the one or more sensing devices include a wireless access point.

Example 35 includes the method of any of Examples 29 to 34, further including, selectively determining whether to activate a first sensing device based, at least in part, on whether a second sensing device is accessible, wherein the first sensing device is coupled to a first portable power supply and the second sensing device is not coupled to the first portable power supply.

Example 36 includes the method of any of Examples 29 to 35, wherein the shared media session is initiated based on a determination that the second device is identified on a permissions list associated with the remote media service.

Example 37 includes the method of any of Examples 29 to 36, wherein the shared media session is initiated based on a determination that the second device is identified on a permissions list associated with the first device.

Example 38 includes the method of any of Examples 29 to 37, wherein the shared media session is initiated based on a determination that the second device is associated with an account of the remote media service.

Example 39 includes the method of any of Examples 29 to 38, further including determining whether a particular device is within the communication range of the one or more sensing devices based on a distance metric indicating an estimated distance between the particular device and at least one of the one or more sensing devices.

Example 40 includes the method of any of Examples 29 to 39, further including determining whether a particular device is within the communication range of the one or more sensing devices based, at least in part, on received signal strength of a transmission from the particular device.

Example 41 includes the method of any of Examples 29 to 40, further including determining whether a particular device is within the communication range of the one or more sensing devices based, at least in part, on location coordinates of the particular device.

Example 42 includes the method of any of Examples 29 to 41, further including, based on the determination to initiate the shared media session with the second device, causing a sharing invitation to be transmitted to the second device.

Example 43 includes the method of Example 42, wherein causing the sharing invitation to be transmitted to the second device includes instructing the remote media service to send the sharing invitation.

Example 44 includes the method of Example 42 or Example 43, wherein the sharing invitation identifies the particular media content.

Example 45 includes the method of any of Examples 42 to 44, wherein the sharing invitation identifies the first device, a user associated with the first device, or both.

Example 46 includes the method of any of Examples 42 to 45, wherein the sharing invitation includes a resource address associated with the shared media session.

Example 47 includes the method of any of Examples 29 to 46, further including: receiving a sharing invitation from the remote media service; and based on the determination to initiate the shared media session, transmitting a sharing acceptance message to the remote media service.

Example 48 includes the method of Example 47, wherein the sharing invitation includes a resource address associated with the shared media session, and the sharing acceptance message includes a request to access the resource address.

Example 49 includes the method of any of Examples 29 to 48, further including receiving at least a portion of the synchronization information from the remote media service.

Example 50 includes the method of any of Examples 29 to 49, further including receiving at least a portion of the synchronization information from the second device.

Example 51 includes the method of any of Examples 29 to 50, further including receiving at least a portion of the synchronization information from a synchronization signal generator.

Example 52 includes the method of any of Examples 29 to 51, wherein the particular media content corresponds to audio content.

Example 53 includes the method of any of Examples 29 to 51, wherein the particular media content corresponds to game content.

Example 54 includes the method of any of Examples 29 to 51, wherein the particular media content corresponds to video content.

Example 55 includes the method of any of Examples 29 to 51, wherein the particular media content corresponds to extended reality content.

According to Example 56, a non-transient computer-readable medium stores instructions that, when executed by one or more processors of a first device, cause the one or more processors to: determine, based on one or more wireless signals, a candidate device list identifying one or more devices that are within a communication range of one or more sensing devices; and based on a determination to initiate a shared media session with a second device of the candidate device list: receive a media stream including particular media content from a remote media service while the particular media content is being sent from the remote media service to the second device; and cause the particular media content to be output, based on synchronization information, contemporaneous with output of the particular media content at the second device.

Example 57 includes the non-transient computer-readable medium of Example 56, wherein the instructions are further executable to cause the one or more processors to receive first wireless signals according to a first communication protocol, and determine a first set of candidate devices that are within a first communication range of a first transceiver based on the first wireless signals, and wherein the candidate device list identifies the first set of candidate devices.

Example 58 includes the non-transient computer-readable medium of Example 57, wherein the instructions are further executable to cause the one or more processors to receive second wireless signals according to a second communication protocol, and determine a second set of candidate devices that are within a second communication range of a second transceiver based on the second wireless signals, and wherein the candidate device list identifies the second set of candidate devices.

Example 59 includes the non-transient computer-readable medium of any of Examples 56 to 58, wherein the instructions are further executable to cause the one or more processors to communicate with the one or more sensing devices to determine the candidate device list.

Example 60 includes the non-transient computer-readable medium of Example 59, wherein the one or more sensing devices include a portable communication device.

Example 61 includes the non-transient computer-readable medium of Example 59 or Example 60, wherein the one or more sensing devices include a wireless access point.

Example 62 includes the non-transient computer-readable medium of any of Examples 56 to 61, wherein the instructions are further executable to cause the one or more processors to selectively determine whether to activate a first sensing device based, at least in part, on whether a second sensing device is accessible, wherein the first sensing device is coupled to a first portable power supply and the second sensing device is not coupled to the first portable power supply.

Example 63 includes the non-transient computer-readable medium of any of Examples 56 to 62, wherein the shared media session is initiated based on a determination that the second device is identified on a permissions list associated with the remote media service.

Example 64 includes the non-transient computer-readable medium of any of Examples 56 to 63, wherein the shared media session is initiated based on a determination that the second device is identified on a permissions list associated with the first device.

Example 65 includes the non-transient computer-readable medium of any of Examples 56 to 64, wherein the shared media session is initiated based on a determination that the second device is associated with an account of the remote media service.

Example 66 includes the non-transient computer-readable medium of any of Examples 56 to 65, wherein the instructions are further executable to cause the one or more processors to determine whether a particular device is within the communication range of the one or more sensing devices based on a distance metric indicating an estimated distance between the particular device and at least one of the one or more sensing devices.

Example 67 includes the non-transient computer-readable medium of any of Examples 56 to 66, wherein the instructions are further executable to cause the one or more processors to determine whether a particular device is within the communication range of the one or more sensing devices based, at least in part, on received signal strength of a transmission from the particular device.

Example 68 includes the non-transient computer-readable medium of any of Examples 56 to 67, wherein the instructions are further executable to cause the one or more processors to determine whether a particular device is within the communication range of the one or more sensing devices based, at least in part, on location coordinates of the particular device.

Example 69 includes the non-transient computer-readable medium of any of Examples 56 to 68, wherein the instructions are further executable to cause the one or more processors to, based on the determination to initiate the shared media session with the second device, cause a sharing invitation to be transmitted to the second device.

Example 70 includes the non-transient computer-readable medium of Example 69, wherein causing the sharing invitation to be transmitted to the second device includes instructing the remote media service to send the sharing invitation.

Example 71 includes the non-transient computer-readable medium of Example 69 or Example 70, wherein the sharing invitation identifies the particular media content.

Example 72 includes the non-transient computer-readable medium of any of Examples 69 to 71, wherein the sharing invitation identifies the first device, a user associated with the first device, or both.

Example 73 includes the non-transient computer-readable medium of any of Examples 69 to 72, wherein the sharing invitation includes a resource address associated with the shared media session.

Example 74 includes the non-transient computer-readable medium of any of Examples 56 to 73, wherein the instructions are further executable to cause the one or more processors to: receive a sharing invitation from the remote media service; and based on the determination to initiate the shared media session, transmit a sharing acceptance message to the remote media service.

Example 75 includes the non-transient computer-readable medium of Example 74, wherein the sharing invitation includes a resource address associated with the shared media session, and the sharing acceptance message includes a request to access the resource address.

Example 76 includes the non-transient computer-readable medium of any of Examples 56 to 75, wherein the instructions are further executable to cause the one or more processors to receive at least a portion of the synchronization information from the remote media service.

Example 77 includes the non-transient computer-readable medium of any of Examples 56 to 76, wherein the instructions are further executable to cause the one or more processors to receive at least a portion of the synchronization information from the second device.

Example 78 includes the non-transient computer-readable medium of any of Examples 56 to 77, wherein the instructions are further executable to cause the one or more processors to receive at least a portion of the synchronization information from a synchronization signal generator.

Example 79 includes the non-transient computer-readable medium of any of Examples 56 to 78, wherein the particular media content corresponds to audio content.

Example 80 includes the non-transient computer-readable medium of any of Examples 56 to 78, wherein the particular media content corresponds to game content.

Example 81 includes the non-transient computer-readable medium of any of Examples 56 to 78, wherein the particular media content corresponds to video content.

Example 82 includes the non-transient computer-readable medium of any of Examples 56 to 78, wherein the particular media content corresponds to extended reality content.

According to Example 83, an apparatus includes: means for determining, based on one or more wireless signals, a candidate device list identifying one or more devices that are within a communication range of one or more sensing devices; means for receiving, based on a determination to initiate a shared media session between a first device and a second device of the candidate device list, a media stream including particular media content from a remote media service while the particular media content is being sent from the remote media service to the second device; and means for causing the particular media content to be output, based on synchronization information, contemporaneous with output of the particular media content at the second device.

Example 84 includes the apparatus of Example 83, further including: means for receiving, via a first transceiver, first wireless signals according to a first communication protocol; and means for determining a first set of candidate devices that are within a first communication range of the first transceiver based on the first wireless signals, wherein the candidate device list identifies the first set of candidate devices.

Example 85 includes the apparatus of Example 84, further including: means for receiving second wireless signals according to a second communication protocol; and means for determining a second set of candidate devices that are within a second communication range of a second transceiver based on the second wireless signals, wherein the candidate device list identifies the second set of candidate devices.

Example 86 includes the apparatus of any of Examples 83 to 85, further including means for communicating with the one or more sensing devices to determine the candidate device list.

Example 87 includes the apparatus of Example 86, wherein the one or more sensing devices include a portable communication device.

Example 88 includes the apparatus of Example 86 or Example 87, wherein the one or more sensing devices include a wireless access point.

Example 89 includes the apparatus of any of Examples 83 to 88, further including means for selectively determining whether to activate a first sensing device based, at least in part, on whether a second sensing device is accessible, wherein the first sensing device is coupled to a first portable power supply and the second sensing device is not coupled to the first portable power supply.

Example 90 includes the apparatus of any of Examples 83 to 89, wherein the shared media session is initiated based on a determination that the second device is identified on a permissions list associated with the remote media service.

Example 91 includes the apparatus of any of Examples 83 to 90, wherein the shared media session is initiated based on a determination that the second device is identified on a permissions list associated with the first device.

Example 92 includes the apparatus of any of Examples 83 to 91, wherein the shared media session is initiated based on a determination that the second device is associated with an account of the remote media service.

Example 93 includes the apparatus of any of Examples 83 to 92, further including means for determining whether a particular device is within the communication range of the one or more sensing devices based on a distance metric indicating an estimated distance between the particular device and at least one of the one or more sensing devices.

Example 94 includes the apparatus of any of Examples 83 to 93, further including means for determining whether a particular device is within the communication range of the one or more sensing devices based, at least in part, on received signal strength of a transmission from the particular device.

Example 95 includes the apparatus of any of Examples 83 to 94, further including means for determining whether a particular device is within the communication range of the one or more sensing devices based, at least in part, on location coordinates of the particular device.

Example 96 includes the apparatus of any of Examples 83 to 95, further including means for causing a sharing invitation to be transmitted to the second device based on the determination to initiate the shared media session with the second device.

Example 97 includes the apparatus of Example 96, wherein causing the sharing invitation to be transmitted to the second device includes instructing the remote media service to send the sharing invitation.

Example 98 includes the apparatus of Example 96 or Example 97, wherein the sharing invitation identifies the particular media content.

Example 99 includes the apparatus of any of Examples 96 to 98, wherein the sharing invitation identifies the first device, a user associated with the first device, or both.

Example 100 includes the apparatus of any of Examples 96 to 99, wherein the sharing invitation includes a resource address associated with the shared media session.

Example 101 includes the apparatus of any of Examples 83 to 100, further including: means for receiving a sharing invitation from the remote media service; and means for transmitting a sharing acceptance message to the remote media service based on the determination to initiate the shared media session.

Example 102 includes the apparatus of Example 101, wherein the sharing invitation includes a resource address associated with the shared media session, and the sharing acceptance message includes a request to access the resource address.

Example 103 includes the apparatus of any of Examples 83 to 102, further including means for receiving at least a portion of the synchronization information from the remote media service.

Example 104 includes the apparatus of any of Examples 83 to 103, further including means for receiving at least a portion of the synchronization information from the second device.

Example 105 includes the apparatus of any of Examples 83 to 104, further including means for receiving at least a portion of the synchronization information from a synchronization signal generator.

Example 106 includes the apparatus of any of Examples 83 to 105, wherein the particular media content corresponds to audio content.

Example 107 includes the apparatus of any of Examples 83 to 105, wherein the particular media content corresponds to game content.

Example 108 includes the apparatus of any of Examples 83 to 105, wherein the particular media content corresponds to video content.

Example 109 includes the apparatus of any of Examples 83 to 105, wherein the particular media content corresponds to extended reality content.

According to Example 110, a first device includes one or more processors configured to: during a first time period after initiation of a shared media session, set first discovery parameters for discovery of candidate devices for media sharing; and during a second time period after termination of the shared media session, set second discovery parameters for discovery of candidate devices for media sharing, wherein the second discovery parameters specify a faster discovery rate than the first discovery parameters.

Example 111 includes the first device of Example 110, wherein the one or more processors are further configured to: determine, based on one or more wireless signals, a candidate device list identifying one or more devices that are within a communication range of one or more sensing devices; and based on a determination to initiate the shared media session with a second device of the candidate device list: receive a media stream including particular media content from a remote media service while the particular media content is being sent from the remote media service to the second device; and cause the particular media content to be output, based on synchronization information, contemporaneous with output of the particular media content at the second device.

Example 112 includes the first device of Example 110 or Example 111, wherein the first discovery parameters specify no discovery during the shared media session.

Example 113 includes the first device of any of Examples 110 to 112, wherein the first discovery parameters specify a first time interval between iterations of discovery operations and the second discovery parameters specify a second time interval between iterations of the discovery operations, wherein the first time interval is at least ten times longer than the second time interval.

Example 114 includes the first device of any of Examples 110 to 113, wherein the first discovery parameters specify a first time interval between iterations of discovery operations and the second discovery parameters specify a second time interval between iterations of the discovery operations, wherein the first time interval is at least one hundred times longer than the second time interval.

Example 115 includes the first device of any of Examples 110 to 114, wherein the first discovery parameters specify a first time interval between iterations of discovery operations and the second discovery parameters specify a second time interval between iterations of the discovery operations, wherein the first time interval is at least one thousand times longer than the second time interval.

Example 116 includes the first device of any of Examples 110 to 115, wherein the shared media session is associated with a particular media content item, and wherein the shared media session is terminated based on reaching an end of the particular media content item.

Example 117 includes the first device of any of Examples 110 to 116, wherein the shared media session is associated with a plurality of media content items of a media stream, and wherein the shared media session is terminated when the media stream is terminated.

Example 118 includes the first device of any of Examples 110 to 117, wherein the one or more processors are further configured to initiate one or more discovery processes, based on current discovery parameters, to determine a candidate device list identifying one or more devices that are within a communication range of the first device.

Example 119 includes the first device of any of Examples 110 to 118, wherein the one or more processors are further configured to, during the first time period, initiate a determination of whether to invite one or more of the candidate devices to be added to the shared media session.

Example 120 includes the first device of any of Examples 110 to 119, wherein the one or more processors are further configured to, during the first time period, initiate a determination of whether to drop a particular device from the shared media session.

Example 121 includes the first device of any of Examples 110 to 120, wherein the one or more processors are further configured to, during the second time period, initiate a determination of whether to initiate a second shared media session with one or more of the candidate devices.

Example 122 includes the first device of any of Examples 110 to 121, further including a first transceiver coupled to the one or more processors and operable to receive, based on current discovery parameters, first wireless signals according to a first communication protocol to discover first candidate devices for media sharing.

Example 123 includes the first device of Example 122, further including a second transceiver coupled to the one or more processors and operable to receive, based on the current discovery parameters, second wireless signals according to a second communication protocol to discover second candidate devices for media sharing, wherein the one or more processors are further configured to determine a candidate device list based on the first candidate devices and the second candidate devices.

Example 124 includes the first device of Example 123, wherein the one or more processors are further configured to determine differences between the candidate device list and a prior candidate device list, wherein a determination of whether to initiate or terminate the shared media session is based on the differences.

According to Example 125, a method includes: during a first time period after initiation of a shared media session, setting, by one or more processors, first discovery parameters for discovery of candidate devices for media sharing; and during a second time period after termination of the shared media session, setting, by one or more processors, second discovery parameters for discovery of candidate devices for media sharing, wherein the second discovery parameters specify a faster discovery rate than the first discovery parameters.

Example 126 includes the method of Example 125, further including: determining, based on one or more wireless signals, a candidate device list identifying one or more devices that are within a communication range of one or more sensing devices; and based on a determination to initiate the shared media session with a second device of the candidate device list: receiving a media stream including particular media content from a remote media service while the particular media content is being sent from the remote media service to the second device; and causing the particular media content to be output, based on synchronization information, contemporaneous with output of the particular media content at the second device.

Example 127 includes the method of Example 125 or Example 126, wherein the first discovery parameters specify no discovery during the shared media session.

Example 128 includes the method of any of Examples 125 to 127, wherein the first discovery parameters specify a first time interval between iterations of discovery operations and the second discovery parameters specify a second time interval between iterations of the discovery operations, wherein the first time interval is at least ten times longer than the second time interval.

Example 129 includes the method of any of Examples 125 to 128, wherein the first discovery parameters specify a first time interval between iterations of discovery operations and the second discovery parameters specify a second time interval between iterations of the discovery operations, wherein the first time interval is at least one hundred times longer than the second time interval.

Example 130 includes the method of any of Examples 125 to 129, wherein the first discovery parameters specify a first time interval between iterations of discovery operations and the second discovery parameters specify a second time interval between iterations of the discovery operations, wherein the first time interval is at least one thousand times longer than the second time interval.

Example 131 includes the method of any of Examples 125 to 130, wherein the shared media session is associated with a particular media content item, and wherein the shared media session is terminated based on reaching an end of the particular media content item.

Example 132 includes the method of any of Examples 125 to 131, wherein the shared media session is associated with a plurality of media content items of a media stream, and wherein the shared media session is terminated when the media stream is terminated.

Example 133 includes the method of any of Examples 125 to 132, further including initiating one or more discovery processes, based on current discovery parameters, to determine a candidate device list identifying one or more devices that are within a communication range of a sensing device.

Example 134 includes the method of any of Examples 125 to 133, further including, during the first time period, initiating a determination of whether to invite one or more of the candidate devices to be added to the shared media session.

Example 135 includes the method of any of Examples 125 to 134, further including, during the first time period, initiating a determination of whether to drop a particular device from the shared media session.

Example 136 includes the method of any of Examples 125 to 135, further including, during the second time period, initiating a determination of whether to initiate a second shared media session with one or more of the candidate devices.

Example 137 includes the method of any of Examples 125 to 136, further including receiving, based on current discovery parameters, first wireless signals according to a first communication protocol to discover first candidate devices for media sharing.

Example 138 includes the method of Example 137, further including: receiving, based on the current discovery parameters, second wireless signals according to a second communication protocol to discover second candidate devices for media sharing; and determining a candidate device list based on the first candidate devices and the second candidate devices.

Example 139 includes the method of Example 138, further including determining differences between the candidate device list and a prior candidate device list, wherein a determination of whether to initiate or terminate the shared media session is based on the differences.

According to Example 140, a non-transitory computer-readable storage medium stores instructions that, when executed by one or more processors, cause the one or more processors to: during a first time period after initiation of a shared media session, set first discovery parameters for discovery of candidate devices for media sharing; and during a second time period after termination of the shared media session, set second discovery parameters for discovery of candidate devices for media sharing, wherein the second discovery parameters specify a faster discovery rate than the first discovery parameters.

Example 141 includes the non-transitory computer-readable storage medium of Example 140, wherein the instructions are further executable to cause the one or more processors to: determine, based on one or more wireless signals, a candidate device list identifying one or more devices that are within a communication range of one or more sensing devices; and based on a determination to initiate the shared media session with a second device of the candidate device list: receive a media stream including particular media content from a remote media service while the particular media content is being sent from the remote media service to the second device; and cause the particular media content to be output, based on synchronization information, contemporaneous with output of the particular media content at the second device.

Example 142 includes the non-transitory computer-readable storage medium of Example 140 or Example 141, wherein the first discovery parameters specify no discovery during the shared media session.

Example 143 includes the non-transitory computer-readable storage medium of any of Examples 140 to 142, wherein the first discovery parameters specify a first time interval between iterations of discovery operations and the second discovery parameters specify a second time interval between iterations of the discovery operations, wherein the first time interval is at least ten times longer than the second time interval.

Example 144 includes the non-transitory computer-readable storage medium of any of Examples 140 to 143, wherein the first discovery parameters specify a first time interval between iterations of discovery operations and the second discovery parameters specify a second time interval between iterations of the discovery operations, wherein the first time interval is at least one hundred times longer than the second time interval.

Example 145 includes the non-transitory computer-readable storage medium of any of Examples 140 to 144, wherein the first discovery parameters specify a first time interval between iterations of discovery operations and the second discovery parameters specify a second time interval between iterations of the discovery operations, wherein the first time interval is at least one thousand times longer than the second time interval.

Example 146 includes the non-transitory computer-readable storage medium of any of Examples 140 to 145, wherein the shared media session is associated with a particular media content item, and wherein the shared media session is terminated based on reaching an end of the particular media content item.

Example 147 includes the non-transitory computer-readable storage medium of any of Examples 140 to 146, wherein the shared media session is associated with a plurality of media content items of a media stream, and wherein the shared media session is terminated when the media stream is terminated.

Example 148 includes the non-transitory computer-readable storage medium of any of Examples 140 to 147, wherein the instructions are further executable to cause the one or more processors to initiate one or more discovery processes, based on current discovery parameters, to determine a candidate device list identifying one or more devices that are within a communication range of a sensing device.

Example 149 includes the non-transitory computer-readable storage medium of any of Examples 140 to 148, wherein the instructions are further executable to cause the one or more processors to, during the first time period, initiate a determination of whether to invite one or more of the candidate devices to be added to the shared media session.

Example 150 includes the non-transitory computer-readable storage medium of any of Examples 140 to 149, wherein the instructions are further executable to cause the one or more processors to, during the first time period, initiate a determination of whether to drop a particular device from the shared media session.

Example 151 includes the non-transitory computer-readable storage medium of any of Examples 140 to 150, wherein the instructions are further executable to cause the one or more processors to, during the second time period, initiate a determination of whether to initiate a second shared media session with one or more of the candidate devices.

Example 152 includes the non-transitory computer-readable storage medium of any of Examples 140 to 151, wherein the instructions are further executable to cause the one or more processors to receive, based on current discovery parameters, first wireless signals according to a first communication protocol to discover first candidate devices for media sharing.

Example 153 includes the non-transitory computer-readable storage medium of Example 152, wherein the instructions are further executable to cause the one or more processors to receive, based on the current discovery parameters, second wireless signals according to a second communication protocol to discover second candidate devices for media sharing, and determine a candidate device list based on the first candidate devices and the second candidate devices.

Example 154 includes the non-transitory computer-readable storage medium of Example 153, wherein the instructions are further executable to cause the one or more processors to determine differences between the candidate device list and a prior candidate device list, wherein a determination of whether to initiate or terminate the shared media session is based on the differences.

According to Example 155, an apparatus includes: means for, during a first time period after initiation of a shared media session, setting first discovery parameters for discovery of candidate devices for media sharing; and means for, during a second time period after termination of the shared media session, setting second discovery parameters for discovery of candidate devices for media sharing, wherein the second discovery parameters specify a faster discovery rate than the first discovery parameters.

Example 156 includes the apparatus of Example 155, further including: means for determining, based on one or more wireless signals, a candidate device list identifying one or more devices that are within a communication range of one or more sensing devices; means for receiving a media stream including particular media content from a remote media service while the particular media content is being sent from the remote media service to a second device based on a determination to initiate the shared media session with a second device of the candidate device list; and means for causing the particular media content to be output, based on synchronization information, contemporaneous with output of the particular media content at the second device.

Example 157 includes the apparatus of Example 155 or Example 156, wherein the first discovery parameters specify no discovery during the shared media session.

Example 158 includes the apparatus of any of Examples 155 to 157, wherein the first discovery parameters specify a first time interval between iterations of discovery operations and the second discovery parameters specify a second time interval between iterations of the discovery operations, wherein the first time interval is at least ten times longer than the second time interval.

Example 159 includes the apparatus of any of Examples 155 to 158, wherein the first discovery parameters specify a first time interval between iterations of discovery operations and the second discovery parameters specify a second time interval between iterations of the discovery operations, wherein the first time interval is at least one hundred times longer than the second time interval.

Example 160 includes the apparatus of any of Examples 155 to 159, wherein the first discovery parameters specify a first time interval between iterations of discovery operations and the second discovery parameters specify a second time interval between iterations of the discovery operations, wherein the first time interval is at least one thousand times longer than the second time interval.

Example 161 includes the apparatus of any of Examples 155 to 160, wherein the shared media session is associated with a particular media content item, and wherein the shared media session is terminated based on reaching an end of the particular media content item.

Example 162 includes the apparatus of any of Examples 155 to 161, wherein the shared media session is associated with a plurality of media content items of a media stream, and wherein the shared media session is terminated when the media stream is terminated.

Example 163 includes the apparatus of any of Examples 155 to 162, further including means for initiating one or more discovery processes, based on current discovery parameters, to determine a candidate device list identifying one or more devices that are within a communication range of a sensing device.

Example 164 includes the apparatus of any of Examples 155 to 163, further including means for initiating, during the first time period, a determination of whether to invite one or more of the candidate devices to be added to the shared media session.

Example 165 includes the apparatus of any of Examples 155 to 164, further including means for initiating, during the first time period, a determination of whether to drop a particular device from the shared media session.

Example 166 includes the apparatus of any of Examples 155 to 165, further including means for initiating, during the first time period, a determination of whether to initiate a second shared media session with one or more of the candidate devices.

Example 167 includes the apparatus of any of Examples 155 to 166, further including means for receiving, based on current discovery parameters, first wireless signals according to a first communication protocol to discover first candidate devices for media sharing.

Example 168 includes the apparatus of Example 167, further including: means for receiving, based on the current discovery parameters, second wireless signals according to a second communication protocol to discover second candidate devices for media sharing; and means for determining a candidate device list based on the first candidate devices and the second candidate devices.

Example 169 includes the apparatus of Example 168, further including means for determining differences between the candidate device list and a prior candidate device list, wherein a determination of whether to initiate or terminate the shared media session is based on the differences.

According to Example 170, a device includes one or more processors configured to: obtain a candidate device list associated with a first device, the candidate device list identifying one or more devices that are within a communication range of a sensing device associated with the first device; based on permissions data associated with the first device, send a sharing invitation to a second device of the candidate device list; based on a response to the sharing invitation, send a first media stream including particular media content to the first device; and while sending the first media stream to the first device, send a second media stream including the particular media content to the second device for output at the second device contemporaneous with output of the particular media content at the first device.

Example 171 includes the device of Example 170, wherein the candidate device list is received from a permissions service associated with the first device.

Example 172 includes the device of Example 170 or Example 171, wherein the permissions data identifies a list of devices approved for media sharing.

Example 173 includes the device of Example 170, wherein the sharing invitation includes a resource address associated with a shared media session associated with the first media stream and the second media stream.

Example 174 includes the device of any of Examples 170 to 173, wherein the one or more processors are further configured to: send a prompt to the first device, the prompt requesting approval to initiate a shared media session with the second device; and receive a response to the prompt, wherein the permissions data is based, at least in part, on the response.

Example 175 includes the device of any of Examples 170 to 174, wherein the one or more processors are further configured to send synchronization information associated with a shared media session to the first device, the second device, or both.

According to Example 176, a method includes: obtaining a candidate device list associated with a first device, the candidate device list identifying one or more devices that are within a communication range of a sensing device associated with the first device; based on permissions data associated with the first device, sending a sharing invitation to a second device of the candidate device list; based on a response to the sharing invitation, sending a first media stream including particular media content to the first device; and while sending the first media stream to the first device, sending a second media stream including the particular media content to the second device for output at the second device contemporaneous with output of the particular media content at the first device.

Example 177 includes the method of Example 176, wherein the candidate device list is received from a permissions service associated with the first device.

Example 178 includes the method of Example 176 or Example 177, wherein the permissions data identifies a list of devices approved for media sharing.

Example 179 includes the method of any of Examples 176 to 178, wherein the sharing invitation includes a resource address associated with a shared media session associated with the first media stream and the second media stream.

Example 180 includes the method of any of Examples 176 to 179, further including: sending a prompt to the first device, the prompt requesting approval to initiate a shared media session with the second device; and receiving a response to the prompt, wherein the permissions data is based, at least in part, on the response.

Example 181 includes the method of any of Examples 176 to 180, further including sending synchronization information associated with a shared media session to the first device, the second device, or both.

According to Example 182, a non-transient computer-readable medium stores instructions that, when executed by one or more processors, cause the one or more processors to: obtain a candidate device list associated with a first device, the candidate device list identifying one or more devices that are within a communication range of a sensing device associated with the first device; and based on permissions data associated with the first device, send a sharing invitation to a second device of the candidate device list; based on a response to the sharing invitation, send a first media stream including particular media content to the first device; and while sending the first media stream to the first device, send a second media stream including the particular media content to the second device for output at the second device contemporaneous with output of the particular media content at the first device.

Example 183 includes the non-transient computer-readable medium of Example 182, wherein the candidate device list is received from a permissions service associated with the first device.

Example 184 includes the non-transient computer-readable medium of Example 182 or Example 183, wherein the permissions data identifies a list of devices approved for media sharing.

Example 185 includes the non-transient computer-readable medium of any of Examples 182 to 184, wherein the sharing invitation includes a resource address associated with a shared media session associated with the first media stream and the second media stream.

Example 186 includes the non-transient computer-readable medium of any of Examples 182 to 185, wherein the instructions are further executable to cause the one or more processors to: send a prompt to the first device, the prompt requesting approval to initiate a shared media session with the second device; and receive a response to the prompt, wherein the permissions data is based, at least in part, on the response.

Example 187 includes the non-transient computer-readable medium of any of Examples 182 to 186, wherein the instructions are further executable to cause the one or more processors to send synchronization information associated with a shared media session to the first device, the second device, or both.

According to Example 188, an apparatus includes: means for obtaining a candidate device list associated with a first device, the candidate device list identifying one or more devices that are within a communication range of a sensing device associated with the first device; means for sending a sharing invitation to a second device of the candidate device list based on permissions data associated with the first device; means for sending a first media stream including particular media content to the first device based on a response to the sharing invitation; and means for sending, while sending the first media stream to the first device, a second media stream including the particular media content to the second device for output at the second device contemporaneous with output of the particular media content at the first device.

Example 189 includes the apparatus of Example 188, wherein the candidate device list is received from a permissions service associated with the first device.

Example 190 includes the apparatus of Example 188 or Example 189, wherein the permissions data identifies a list of devices approved for media sharing.

Example 191 includes the apparatus of any of Examples 188 to 190, wherein the sharing invitation includes a resource address associated with a shared media session associated with the first media stream and the second media stream.

Example 192 includes the apparatus of any of Examples 188 to 191, further including: means for sending a prompt to the first device, the prompt requesting approval to initiate a shared media session with the second device; and means for receiving a response to the prompt, wherein the permissions data is based, at least in part, on the response.

Example 193 includes the apparatus of any of Examples 188 to 192, further including means for sending synchronization information associated with a shared media session to the first device, the second device, or both.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory computer-readable medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A first device comprising:
    a memory configured to store a candidate device list identifying one or more devices that are within a communication range of one or more sensing devices based on one or more wireless signals; and
    one or more processors configured to:
        transmit differences between versions of the candidate device list to a permissions service;
        receive, from the permissions service, an indication that a second device is identified on a permissions list associated with a remote media service, wherein the permissions list indicates devices permitted to establish shared media sessions; and
        based on a determination to initiate a shared media session with the second device:
            receive a media stream including particular media content from the remote media service while the particular media content is being sent from the remote media service to the second device; and
            cause the particular media content to be output, based on synchronization information, contemporaneous with output of the particular media content at the second device.

2. The first device of claim 1, further comprising the one or more sensing devices, wherein the one or more sensing devices comprise a first transceiver coupled to the one or more processors and operable to receive first wireless signals according to a first communication protocol, wherein the one or more processors are further configured to determine a first set of candidate devices that are within a first communication range of the first transceiver based on the first wireless signals, and wherein the candidate device list identifies the first set of candidate devices.

3. The first device of claim 2, wherein the one or more sensing devices further comprise a second transceiver coupled to the one or more processors and operable to receive second wireless signals according to a second communication protocol, wherein the one or more processors are further configured to determine a second set of candidate devices that are within a second communication range of the second transceiver based on the second wireless signals, and wherein the candidate device list identifies the second set of candidate devices.

4. The first device of claim 1, further comprising one or more transceivers coupled to the one or more processors and operable to communicate with the one or more sensing devices to determine the candidate device list.

5. The first device of claim 1, further comprising a portable power supply coupled to the one or more processors, wherein the one or more processors are further configured to selectively determine whether to activate a first sensing device based, at least in part, on whether a second sensing device is accessible, and wherein the first sensing device is coupled to the portable power supply and the second sensing device is not coupled to the portable power supply.

6. The first device of claim 1, further comprising a modem coupled to the one or more processors and operable to receive the media stream via one or more wireless transmissions.

7. The first device of claim 1, wherein the shared media session is initiated based on a determination that the second device is associated with an account or identified on a permissions list associated with the remote media service.

8. The first device of claim 1, wherein the shared media session is initiated based on a determination that the second device is identified on a permissions list associated with the first device.

9. The first device of claim 1, wherein the one or more processors are further configured to determine whether a particular device is within the communication range of the one or more sensing devices based on a distance metric indicating an estimated distance between the particular device and at least one of the one or more sensing devices.

10. The first device of claim 1, wherein the one or more processors are further configured to, based on the determination to initiate the shared media session with the second device, cause a sharing invitation to be transmitted to the second device.

11. The first device of claim 10, wherein causing the sharing invitation to be transmitted to the second device includes instructing the remote media service to send the sharing invitation.

12. The first device of claim 10, wherein the sharing invitation identifies the particular media content, identifies the first device, identifies a user associated with the first device, identifies a resource address associated with the shared media session, or a combination thereof.

13. The first device of claim 1, wherein the one or more processors are further configured to:

receive a sharing invitation from the remote media service; and based on the determination to initiate the shared media session, transmit a sharing acceptance message to the remote media service.

14. The first device of claim 1, wherein the particular media content corresponds to audio content, game content, video content, extended reality content, or a combination thereof.

15. A method comprising:
   determining, by one or more processors of a first device and based on one or more wireless signals, a candidate device list identifying one or more devices that are within a communication range of one or more sensing devices;
   transmitting, by the one or more processors, differences between versions of the candidate device list to a permissions service;
   receiving, by the one or more processors from the permissions service, an indication that a second device is identified on a permissions list associated with a remote media service, wherein the permissions list indicates devices permitted to establish shared media sessions; and
   based on a determination to initiate a shared media session with the second device:
      receiving, by the one or more processors, a media stream including particular media content from the remote media service while the particular media content is being sent from the remote media service to the second device; and
      causing the particular media content to be output, based on synchronization information, contemporaneous with output of the particular media content at the second device.

16. The method of claim 15, further comprising:
   receiving a sharing invitation from the remote media service; and
   based on the determination to initiate the shared media session, transmitting a sharing acceptance message to the remote media service.

17. A first device comprising:
   a memory configured to store discovery parameters; and
   one or more processors configured to:
      during a first time period after initiation of a shared media session, set first discovery parameters for discovery of candidate devices for media sharing;
      determine a power level of a battery of the first device;
      modify a discovery rate specified by the first discovery parameters based on the determined power level, wherein the discovery rate controls how frequently the first device performs discovery operations to identify candidate devices; and
      during a second time period after termination of the shared media session, set second discovery parameters for discovery of candidate devices for media sharing, wherein the second discovery parameters specify a faster discovery rate than the modified discovery rate of the first discovery parameters.

18. The first device of claim 17, wherein the one or more processors are further configured to:
   determine, based on one or more wireless signals, a candidate device list identifying one or more devices that are within a communication range of one or more sensing devices; and
   based on a determination to initiate the shared media session with a second device of the candidate device list:
      receive a media stream including particular media content from a remote media service while the particular media content is being sent from the remote media service to the second device; and
      cause the particular media content to be output, based on synchronization information, contemporaneous with output of the particular media content at the second device.

19. The first device of claim 17, wherein the first discovery parameters specify a first time interval between iterations of discovery operations and the second discovery parameters specify a second time interval between iterations of the discovery operations, and wherein the first time interval is at least ten times longer than the second time interval.

20. A method comprising:
   during a first time period after initiation of a shared media session, setting, by one or more processors of a first device, first discovery parameters for discovery of candidate devices for media sharing;
   determining a power level of a battery of the first device;
   modifying a discovery rate specified by the first discovery parameters based on the determined power level, wherein the discovery rate controls how frequently the first device performs discovery operations to identify candidate devices; and
   during a second time period after termination of the shared media session, setting, by the one or more processors, second discovery parameters for discovery of candidate devices for media sharing, wherein the second discovery parameters specify a faster discovery rate than the modified discovery rate of the first discovery parameters.

21. The method of claim 20, further comprising:
   determining, based on one or more wireless signals, a candidate device list identifying one or more devices that are within a communication range of one or more sensing devices; and
   based on a determination to initiate the shared media session with a second device of the candidate device list:
      receiving a media stream including particular media content from a remote media service while the particular media content is being sent from the remote media service to the second device; and
      causing the particular media content to be output, based on synchronization information, contemporaneous with output of the particular media content at the second device.

22. The method of claim 20, wherein the first discovery parameters specify a first time interval between iterations of discovery operations and the second discovery parameters specify a second time interval between iterations of the discovery operations, and wherein the first time interval is at least ten times longer than the second time interval.

23. The method of claim 20, wherein the shared media session is associated with a particular media content item, and wherein the shared media session is terminated based on reaching an end of the particular media content item.

24. The method of claim 20, wherein the shared media session is associated with a plurality of media content items of a media stream, and wherein the shared media session is terminated when the media stream is terminated.

25. The method of claim 20, further comprising initiating one or more discovery processes, based on current discovery parameters, to determine a candidate device list identifying one or more devices that are within a communication range of a sensing device.

26. The method of claim 20, further comprising, during the first time period, initiating a determination of whether to drop a particular device from the shared media session.

27. The method of claim 20, further comprising, during the second time period, initiating a determination of whether to initiate a second shared media session with one or more of the candidate devices.

28. The method of claim 20, further comprising:

receiving, based on current discovery parameters, first wireless signals according to a first communication protocol to discover first candidate devices for media sharing;

receiving, based on the current discovery parameters, second wireless signals according to a second communication protocol to discover second candidate devices for media sharing;

determining a candidate device list based on the first candidate devices and the second candidate devices; and determining differences between the candidate device list and a prior candidate device list, wherein a determination of whether to initiate or terminate the shared media session is based on the differences.

29. The first device of claim 1, further comprising:

a display device configured to display a notification indicating availability of the second device for the shared media session; and one or more microphones configured to receive a voice command to initiate the shared media session with the second device in response to the notification.

30. The first device of claim 17 further comprising:

a display device configured to display prompts related to setting up the shared media session;

one or more cameras configured to capture video content during the shared media session; and a speaker configured to output audio content of the shared media session while the display device displays the video content.

* * * * *